United States Patent
Smith et al.

(10) Patent No.: US 8,526,427 B1
(45) Date of Patent: Sep. 3, 2013

(54) PORT-BASED LOADSHARING FOR A SATELLITE SWITCH

(75) Inventors: Michael R. Smith, Morgan Hill, CA (US); Jeffrey Ym Wang, Saratoga, CA (US); Ali Golshan, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 2062 days.

(21) Appl. No.: 10/690,348

(22) Filed: Oct. 21, 2003

(51) Int. Cl.
*H04L 12/56* (2011.01)
*H04L 12/28* (2006.01)

(52) U.S. Cl.
USPC .......................................................... 370/389

(58) Field of Classification Search
None
See application file for complete search history.

(56) References Cited

U.S. PATENT DOCUMENTS

| | | | |
|---|---|---|---|
| 4,387,371 A | 6/1983 | Beker et al. | 340/825.52 |
| 5,058,110 A | 10/1991 | Beach et al. | 370/464 |
| 5,311,593 A | 5/1994 | Carmi | |
| 5,371,852 A | 12/1994 | Attanasio et al. | 709/245 |
| 5,394,402 A | 2/1995 | Ross | |
| 5,473,599 A | 12/1995 | Li et al. | 370/16 |
| 5,680,589 A | 10/1997 | Klingman | 703/23 |
| 5,822,512 A | 10/1998 | Goodrm et al. | 395/182.11 |
| 5,825,772 A | 10/1998 | Dobbins et al. | 370/396 |
| 5,835,725 A | 11/1998 | Chiang et al. | |
| 5,872,783 A * | 2/1999 | Chin | 370/395.32 |
| 5,959,968 A | 9/1999 | Chin et al. | 370/216 |
| 5,959,972 A | 9/1999 | Hamami | 370/228 |
| 5,959,989 A | 9/1999 | Gleeson et al. | 370/390 |
| 5,978,852 A | 11/1999 | Myrick et al. | 709/238 |
| 6,032,194 A | 2/2000 | Gai et al. | 709/239 |
| 6,058,238 A | 5/2000 | Ng | 709/223 |
| 6,064,671 A | 5/2000 | Killian | 370/389 |
| 6,108,300 A | 8/2000 | Coile et al. | 370/217 |
| 6,163,543 A | 12/2000 | Chin et al. | 370/400 |

(Continued)

FOREIGN PATENT DOCUMENTS

| | | | |
|---|---|---|---|
| EP | 1 035 685 | 9/2000 | 12/18 |
| EP | 1 309 135 A1 | 5/2003 | |

(Continued)

OTHER PUBLICATIONS

Norman W. Finn, pending U.S. Patent Application entitled "Multi-Bridge LAN Aggregation," U.S. Appl. No. 10/282,439, filed Oct. 29, 2002, including Specification: pp. 1-28; Drawings: Figures 1-7C on 9 sheets.

(Continued)

*Primary Examiner* — John Blanton
*Assistant Examiner* — Christopher Crutchfield
(74) *Attorney, Agent, or Firm* — Campbell Stephenson LLP

(57) ABSTRACT

A method may involve: receiving a packet (e.g., via a port or uplink interface in a satellite switch) and conveying the packet between one or more ports and one of several uplink interfaces. The one or more ports and the uplink interface are associated with each other. The association can be independent of VLAN (Virtual Local Area Network). As an example, such a method can involve: receiving a first packet via a first port; conveying the first packet to a distribution-layer via a first uplink interface; receiving a second packet via a second port; and conveying the second packet to the distribution-layer via a second uplink interface, where the first uplink interface is associated with the first port and the second uplink interface is associated with the second port. In some embodiments, ports and uplink interfaces are associated by being assigned to the same virtual linecard.

44 Claims, 11 Drawing Sheets

(56) References Cited

U.S. PATENT DOCUMENTS

| | | | |
|---|---|---|---|
| 6,181,681 B1 | 1/2001 | Hiscock et al. | 370/279 |
| 6,181,699 B1* | 1/2001 | Crinion et al. | 370/392 |
| 6,195,351 B1 | 2/2001 | Hiscock et al. | 370/389 |
| 6,202,114 B1 | 3/2001 | Dutt et al. | 710/311 |
| 6,222,820 B1 | 4/2001 | Hamami | 370/218 |
| 6,229,787 B1 | 5/2001 | Byrne | 370/218 |
| 6,236,659 B1 | 5/2001 | Pascoe | 370/404 |
| 6,243,360 B1 | 6/2001 | Basilico | 370/231 |
| 6,266,335 B1 | 7/2001 | Bhaskaran | |
| 6,275,953 B1 | 8/2001 | Vahalia et al. | 714/11 |
| 6,285,656 B1 | 9/2001 | Chaganty et al. | 370/228 |
| 6,298,061 B1 | 10/2001 | Chin et al. | 370/400 |
| 6,308,220 B1 | 10/2001 | Mathur | |
| 6,377,992 B1 | 4/2002 | Fernandez et al. | 709/227 |
| 6,388,995 B1 | 5/2002 | Gai et al. | 370/256 |
| 6,400,715 B1 | 6/2002 | Beaudoin | |
| 6,421,787 B1 | 7/2002 | Slaughter et al. | 714/4 |
| 6,460,088 B1 | 10/2002 | Merchant | 709/236 |
| 6,487,591 B1 | 11/2002 | Budhraja et al. | 709/223 |
| 6,519,231 B1 | 2/2003 | Ding et al. | 370/256 |
| 6,535,490 B1 | 3/2003 | Jain | 370/256 |
| 6,535,491 B2 | 3/2003 | Gai et al. | 370/256 |
| 6,567,403 B1 | 5/2003 | Congdon et al. | 370/389 |
| 6,570,845 B1* | 5/2003 | Blanc et al. | 370/218 |
| 6,657,973 B1 | 12/2003 | Arima | 370/254 |
| 6,658,016 B1 | 12/2003 | Dai et al. | 370/424 |
| 6,674,713 B1 | 1/2004 | Berg et al. | 370/217 |
| 6,678,241 B1 | 1/2004 | Gai et al. | 370/216 |
| 6,687,758 B2 | 2/2004 | Craft et al. | 709/250 |
| 6,690,668 B1 | 2/2004 | Szczepanek et al. | 370/392 |
| 6,697,339 B1 | 2/2004 | Jain | 370/256 |
| 6,728,780 B1 | 4/2004 | Hebert | 709/239 |
| 6,735,198 B1 | 5/2004 | Edsall et al. | 370/389 |
| 6,735,205 B1 | 5/2004 | Mankude et al. | 370/395.32 |
| 6,738,345 B1 | 5/2004 | Williamson | 370/217 |
| 6,760,776 B1 | 7/2004 | Gallo et al. | 709/238 |
| 6,804,721 B2 | 10/2004 | Wils et al. | 709/230 |
| 6,810,421 B1 | 10/2004 | Ishizaki et al. | 709/226 |
| 6,816,467 B1 | 11/2004 | Muller et al. | 370/256 |
| 6,856,591 B1 | 2/2005 | Ma et al. | 370/216 |
| 6,915,340 B2 | 7/2005 | Tanaka | 709/220 |
| 6,938,095 B2 | 8/2005 | Basturk et al. | 709/238 |
| 6,941,487 B1 | 9/2005 | Balakrishnan et al. | 714/4 |
| 6,980,534 B1 | 12/2005 | Nee et al. | 370/329 |
| 6,981,174 B1 | 12/2005 | Hanning | 714/5.1 |
| 7,042,855 B1 | 5/2006 | Gilchrist et al. | 370/328 |
| 7,050,433 B2 | 5/2006 | Ando et al. | |
| 7,061,858 B1 | 6/2006 | Di Benedetto et al. | 370/219 |
| 7,061,875 B1 | 6/2006 | Portolani et al. | 370/256 |
| 7,126,923 B1 | 10/2006 | Yang et al. | 370/256 |
| 7,127,633 B1 | 10/2006 | Olson et al. | 714/4 |
| 7,130,305 B2 | 10/2006 | Kuukankorpi et al. | 370/392 |
| 7,152,178 B1 | 12/2006 | Vook et al. | 714/4.3 |
| 7,178,052 B2 | 2/2007 | Hebbar et al. | 714/4 |
| 7,188,189 B2 | 3/2007 | Karol et al. | 709/238 |
| 7,251,217 B2* | 7/2007 | Wong et al. | 370/232 |
| 7,286,853 B2 | 10/2007 | Meier | 455/560 |
| 7,502,865 B2 | 3/2009 | Seto | 709/238 |
| 7,636,369 B2 | 12/2009 | Wong | |
| 7,639,605 B2 | 12/2009 | Narayanan et al. | 370/219 |
| 7,672,228 B1 | 3/2010 | Senevirathne et al. | 370/219 |
| 7,818,628 B1 | 10/2010 | Bishara | 714/43 |
| 7,869,803 B2 | 1/2011 | Corson et al. | |
| 8,094,581 B2 | 1/2012 | Bahls et al. | |
| 2001/0014097 A1 | 8/2001 | Beck et al. | 370/401 |
| 2002/0016874 A1 | 2/2002 | Watanuki et al. | 710/51 |
| 2002/0018489 A1 | 2/2002 | Ambe et al. | 370/475 |
| 2002/0073338 A1 | 6/2002 | Burrows et al. | 713/201 |
| 2002/0080720 A1 | 6/2002 | Pegrum et al. | 370/236 |
| 2002/0087716 A1 | 7/2002 | Mustafa | 709/236 |
| 2002/0089978 A1 | 7/2002 | Wang et al. | 370/389 |
| 2002/0091755 A1 | 7/2002 | Narin | 709/203 |
| 2002/0103921 A1 | 8/2002 | Nair et al. | 709/232 |
| 2002/0110148 A1 | 8/2002 | Hickman et al. | 370/475 |
| 2002/0126671 A1 | 9/2002 | Ellis et al. | 370/390 |
| 2002/0146008 A1 | 10/2002 | Kaplan | 370/390 |
| 2002/0152320 A1 | 10/2002 | Lau | 709/238 |
| 2002/0156612 A1 | 10/2002 | Schulter et al. | 703/23 |
| 2002/0165981 A1 | 11/2002 | Basturk et al. | 709/242 |
| 2002/0176450 A1 | 11/2002 | Kong | 370/539 |
| 2002/0184387 A1 | 12/2002 | Yamaya et al. | 709/238 |
| 2002/0186654 A1 | 12/2002 | Tornar | 370/225 |
| 2002/0188711 A1 | 12/2002 | Meyer et al. | 709/223 |
| 2002/0196802 A1 | 12/2002 | Sakov et al. | 370/432 |
| 2003/0007489 A1 | 1/2003 | Krishnan et al. | 370/392 |
| 2003/0026248 A1 | 2/2003 | Hiroki | 370/352 |
| 2003/0037165 A1 | 2/2003 | Shinomiya | 709/238 |
| 2003/0051061 A1 | 3/2003 | Hank et al. | 709/250 |
| 2003/0061533 A1 | 3/2003 | Perloff et al. | 714/9 |
| 2003/0093557 A1 | 5/2003 | Giraud et al. | 709/239 |
| 2003/0097470 A1 | 5/2003 | Lapuh et al. | 709/239 |
| 2003/0110344 A1 | 6/2003 | Szczepanek et al. | 711/100 |
| 2003/0142680 A1 | 7/2003 | Oguchi | 370/400 |
| 2003/0152101 A1 | 8/2003 | Feng | 370/445 |
| 2003/0169734 A1 | 9/2003 | Lu et al. | 370/386 |
| 2003/0172147 A1 | 9/2003 | Chang et al. | 709/223 |
| 2003/0198231 A1 | 10/2003 | Kalkunte et al. | 370/395.31 |
| 2004/0057469 A1 | 3/2004 | Nuss et al. | 370/535 |
| 2004/0066781 A1 | 4/2004 | Shankar et al. | 370/389 |
| 2004/0078621 A1 | 4/2004 | Talaugon et al. | 714/4 |
| 2004/0105390 A1 | 6/2004 | Saksio | 370/245 |
| 2004/0156390 A1 | 8/2004 | Prasad et al. | 370/466 |
| 2004/0179507 A1 | 9/2004 | Batra et al. | 370/343 |
| 2004/0208116 A1 | 10/2004 | Saint Etienne et al. | 370/216 |
| 2005/0036488 A1 | 2/2005 | Kalkunte et al. | 370/389 |
| 2005/0041665 A1 | 2/2005 | Weyman et al. | 370/390 |
| 2005/0044186 A1 | 2/2005 | Petrisor | 709/219 |
| 2005/0058063 A1 | 3/2005 | Masuyama et al. | 370/219 |
| 2005/0063395 A1 | 3/2005 | Smith et al. | 370/399 |
| 2005/0083933 A1 | 4/2005 | Fine et al. | 370/390 |
| 2005/0089014 A1 | 4/2005 | Levin et al. | 370/351 |
| 2005/0111483 A1 | 5/2005 | Cripe et al. | 370/463 |
| 2005/0169311 A1 | 8/2005 | Miller et al. | 370/471 |
| 2005/0193114 A1 | 9/2005 | Colby et al. | 709/226 |
| 2005/0198371 A1 | 9/2005 | Smith et al. | 709/238 |
| 2005/0243826 A1 | 11/2005 | Smith et al. | 370/392 |
| 2005/0259646 A1 | 11/2005 | Smith et al. | 370/389 |
| 2005/0265346 A1 | 12/2005 | Ho et al. | 370/392 |
| 2006/0007859 A1 | 1/2006 | Kadambi et al. | |
| 2006/0015643 A1 | 1/2006 | Orava et al. | 709/238 |
| 2006/0062187 A1* | 3/2006 | Rune | 370/338 |
| 2006/0215679 A1 | 9/2006 | Musoll et al. | 370/412 |
| 2007/0154219 A1 | 7/2007 | Feinberg | 398/104 |
| 2007/0159971 A1 | 7/2007 | Zhang et al. | 370/230 |
| 2007/0180266 A1 | 8/2007 | Kang et al. | 713/189 |
| 2009/0080431 A1 | 3/2009 | Rekhter | 370/392 |
| 2009/0134996 A1 | 5/2009 | White et al. | 340/538 |

FOREIGN PATENT DOCUMENTS

| | | | |
|---|---|---|---|
| EP | 1 401 147 | 3/2004 | 12/26 |
| GB | 2 362 538 | 5/2000 | |
| WO | WO 00/72531 | 11/2000 | |
| WO | WO 00/78004 | 12/2000 | |
| WO | WO 02/01413 | 5/2001 | |
| WO | WO 02/18965 | 3/2002 | 31/8 |
| WO | WO 03/081451 | 10/2003 | |

OTHER PUBLICATIONS

Cisco Systems, Inc.; Copyright 1989-1997 © http://www.cisco.com/univercd/cc/td/doc/product/rtrmgmt/sw_ntman/cwsimain/cwsi2/cwsiug2/vlan2/stpapp.htm. "Understanding Spanning-Tree Protocol," Appendix C, pp. C-1 through C-12.

Pedroso, Carlos Marcelo and Fonseca, Keiko, *Modeling Weight Round Robin Packet Scheduler With Petri Nets*, Communication Systems, IEEE, vol. 1, Nov. 25, 2002, pp. 342-345.

Liu, Dake, et al, *Configuration-Based Architecture for High Speed and General-Purpose Protocol Processing*, Signal Processing Systems, IEEE, Oct. 20, 1999, pp. 540-547.

D.T. Stott, "Layer-2 Path Discovery Using Spanning Tree MIBs", Avaya Labs Research, Avaya, Inc., Mar. 7, 2002, pp. 1-23.

International Search Report as mailed from the PCT on Mar. 18, 2005, for International Application No. PCT/US2004/034851, 2 pages.

Cisco Systems, Inc.; Copyright 1989-1997 © http://www.cisco.com/univercd/cc/td/doc/product/rtrmgmt/sw_ntman/cwsimain/cwsi2/cwsiug2/vlan2/stpapp.htm "Understanding Spanning-Tree Protocol," Appendix C, pp. C-1 through C-12.

News Release: "Cisco Raises the Bar in Stackable Switching, Introduces Catalyst 3750 Series with Cisco StackWise™ Technology;" 3 pages; http://newsroom.cisco.com/dlls/prod_041503b.html.

Cisco Catalyst 3750 Series Switches: "Cisco StackWise Technology White Paper;" 8 pages; http://www.cisco.com/en/US/products/hw/switches/ps5023/products_white_paper09186a00801b096a.shtml (Catalyst 3750 announced on Apr. 15, 2003. see AJ).

Hewlett Packard, "LAN Aggregation Through Switch Meshing," XP-002284775, Jun. 1998, URL:http:/www.hp.com/rnd/library/pdf/techlib_meshing.pdf [retrieved on Jun. 16, 2004], 12 pages.

Huang, et al., "An Open Solution to Fault-Tolerant Ethernet: Design, Prototyping, and Evaluation," Performance, Computing and Communications Conference, 1999 IEEE International (Feb. 10-12, 1999), Scotsdale, Arizona, XP010323654. ISBN 0-7803-5258-0. Feb. 10, 1999, pp. 461-468.

Michael Ward; "802.1S Solves Architecture Issues;" *Network World*, Aug. 4, 2003; 3 pages; http://www.n_wfusion.com/cgi-bin/mailto/x.cgi.

Knight, S. et al. Virtual Router Redundancy Protocol, IETF, Apr. 1998, 27 pages.

International Search Report dated Aug. 2, 2005, from related International Application No. PCT/US2004/029554, 6 pages.

Written Opinion of the International Searching Authority dated Aug. 2, 2005 from related International Application No. PCT/US2004/029554, 5 pages.

International Search Report dated Jan. 14, 2005 from corresponding International Application No. PCT/US2004/029553, 4 pages.

Written Opinion of the International Searching Authority dated Jan. 14, 2005 from corresponding International Application No. PCT/US2004/029553, 6 pages.

CIPO Examination Report in related Canadian Patent Application No. 2,534,511 dated May 1, 2006, 4 pages.

Nortel Networks, "Split Multi-link Trunking," http://www.nortelnetworks.com/corporate/technology/smlt/, pp. 1-2 (printed Jul. 17, 2003).

Nortel Networks, "Split Multi-link Trunking FAQs," ' http://www.nortelnetworks.com/corporate/technology/smlt/faq.html, pp. 1-3 (printed on Oct. 21, 2003).

* cited by examiner

Local Target Agent 155

| | Port 151A | Port 151B | Port 151C | Port 151D | Port 151E | Port 151F | Uplink Interface 153A | Uplink Interface 153B |
|---|---|---|---|---|---|---|---|---|
| Index 1 | 1 | 0 | 0 | 0 | 0 | 0 | 0 | 0 |
| Index 2 | 0 | 1 | 0 | 1 | 0 | 1 | 0 | 0 |
| Index 3 | 0 | 0 | 1 | 1 | 0 | 0 | 0 | 0 |
| Index 4 | 0 | 1 | 1 | 0 | 1 | 0 | 0 | 0 |
| Index 5 | 0 | 0 | 0 | 0 | 0 | 1 | 0 | 0 |
| Index 6 | 0 | 0 | 0 | 0 | 0 | 0 | 0 | 0 |
| Index 7 | 1 | 0 | 1 | 0 | 0 | 0 | 0 | 0 |
| Index 8 | 1 | 1 | 1 | 0 | 1 | 0 | 0 | 0 |
| Index 9 | 0 | 0 | 0 | 1 | 0 | 1 | 0 | 0 |
| Index 10 | 1 | 1 | 1 | 0 | 0 | 0 | 0 | 0 |
| Index 11 | 0 | 0 | 0 | 0 | 0 | 0 | 0 | 1 |
| Index 12 | 0 | 0 | 0 | 0 | 0 | 0 | 1 | 0 |

Local Target Table 756

| | Port 151A | Port 151B | Port 151C | Port 151D | Port 151E | Port 151F | Uplink Interface 153A | Uplink Interface 153B |
|---|---|---|---|---|---|---|---|---|
| VLC 300A | 1 | 1 | 1 | 0 | 0 | 0 | 1 | 0 |
| VLC 300B | 0 | 0 | 0 | 1 | 1 | 1 | 0 | 1 |

Local Target Masks 757

FIG. 7

|  | Port 151A | Port 151B | Port 151C | Port 151D | Port 151E | Port 151F | Uplink Interface 153A | Uplink Interface 153B | Uplink Interface 153C |
|---|---|---|---|---|---|---|---|---|---|
| Uplink 153A | 1 | 1 | 1 | 0 | 0 | 0 | 1 | 0 | 0 |
| Uplink 153B | 0 | 0 | 0 | 1 | 1 | 1 | 0 | 1 | 1 |
| Uplink 153C | 0 | 0 | 0 | 1 | 1 | 1 | 0 | 1 | 1 |

↖— LTL Masks 757

PORT-BASED LOADSHARING FOR A SATELLITE SWITCH

FIELD OF THE INVENTION

The present invention relates to networking and, more specifically, to load-sharing of redundant links between access-layer satellite switches and distribution-layer switches.

BACKGROUND

In order to provide increased network reliability, redundant switches and links are often included in a network. If a switch or link fails, a redundant switch or link, already in place within the network, can quickly be enabled to replace the failed switch or link. Since the redundant switch or link can typically be enabled as a replacement more quickly than the failed component can be replaced or repaired, having redundant links and/or switching can provide a more reliable network.

When redundant components are included within a network, it is often desirable to be able to use the redundant components during normal network operation, before the failure of corresponding components. For example, if two links are implemented between an access-layer switch in a wiring closet (referred to herein as a satellite switch) and a group of distribution-layer switches, it is desirable to use both links (as opposed to leaving one link idle) to provide increased bandwidth. However, the use of both links can lead to undesirable bridging loops.

Bridging loops arise when there are multiple paths between two LANs (Local Area Networks) and those paths are each used to send a copy of the same packet. This can result in the device to which the packet is being sent receiving multiple copies of the packet. If the packet is being broadcast, the use of multiple paths can lead to situations in which the packet is forwarded endlessly, consuming a significant portion of the available network bandwidth and blocking the transmission of other packets. Bridging loops can also lead to network problems by interfering with the ability of network devices to correctly learn the network configuration. Typically, network devices operate by "learning" which LAN includes a particular client device by tracking which of the network device's ports receives packets sent by that client device. For example, if a copy of the same packet is transmitted via multiple paths to multiple different network devices, one of those network devices may in turn forward its copy back to another one of the network devices that has already received a copy of the packet directly from the client device. As a result, the other network device receives two copies of the packet and incorrectly updates its forwarding information to indicate that the network device should communicate with the client device via the port that received the second copy of the packet. However, the network device's forwarding information should instead indicate that the network device should communicate with the client device via the port that received the first copy of the packet directly from the client device. The incorrect forwarding information causes the network device to use the wrong port when subsequently attempting to communicate with the client device, which can lead to inefficiencies or even failures in communication.

In order to avoid bridging loops that result from using redundant links, a STP (Spanning Tree Protocol) may be used. Typically, a STP identifies multiple paths between a given pair of network nodes and blocks all but one of those paths. Thus, while STP prevents bridging loops, it may also prevent utilization of redundant links between network nodes. A more recent version of STP, which operates on a per-VLAN (Virtual Local Area Network) basis, provides a better solution (VLANs logically separate a single physical LAN into multiple logical LANs). With per-VLAN STP, one redundant link can be blocked for one set of one or more VLANs while the other redundant link is blocked for another set of VLANs. Thus, if there are multiple VLANs implemented, both of the redundant links can be used and bridging loops for each VLAN can be avoided. However, this solution is only available when there are multiple VLANs. If multiple VLANs are not implemented, effective utilization of both redundant links that avoids bridging loops may be difficult. Additionally, the granularity of the load balancing provided by per-VLAN STP is limited to the number of VLANs. The loadsharing provided by per-VLAN STP may also be heavily lopsided if one VLAN carries significantly more traffic than the other VLANs. As the above description shows, existing technologies may not provide desired usage of redundant resources in certain situations.

SUMMARY

Various embodiments of systems and methods for performing port-based loadsharing in a satellite switch are disclosed. Such systems and methods may be used to achieve better usage of redundant resources than might otherwise be available.

A method may involve: receiving a packet (e.g., via a port or uplink interface in a satellite switch) and conveying the packet between one or more ports and one of several uplink interfaces. The one or more ports and the uplink interface are associated with each other. The association can be independent of VLAN (Virtual Local Area Network). As an example, in one embodiment, such a method can involve: receiving a first packet via a first port; conveying the first packet to the distribution-layer via a first uplink interface; receiving a second packet via a second port; and conveying the second packet to the distribution-layer via a second uplink interface, where the first uplink interface is associated with the first port and the second uplink interface is associated with the second port. The first port can be associated with the same VLAN as the second port. By communicating packets between only associated ports and uplink interfaces, undesirable bridging loops can be avoided. Several of the ports can be associated with the same uplink interface, and several uplink interfaces can be associated with the same port.

In some embodiments, a system includes several ports, several uplink interfaces, and a local target agent configured to convey packets between the ports and uplink interfaces. The local target agent is configured to convey a packet between one of the ports and one of the uplink interfaces. The one of the ports and the one of the uplink interfaces are associated with each other (e.g., by being assigned to the same virtual linecard). Ports associated with different VLANs can be assigned to the same virtual linecard.

The local target agent can use a forwarding index, appended to each packet received via one of the uplink interfaces, to select one or more of the ports from which to output each packet. The local target agent selects one set of ports if a first packet, to which a first forwarding index is appended, is received via one of the uplink interfaces. However, if a second packet to which the first forwarding index is appended is received via a different one of the plurality of uplink interfaces, the local target agent is configured to select a different set of ports. In other words, the same forwarding index may be used differently depending on which uplink interface received that forwarding information.

Software implementing a local target agent can be stored upon a computer readable medium. Such software can be configured to detect reception of a packet by a network device, which includes several ports and several uplink interfaces. The software can convey the packet between one or more of the ports and an associated one of the uplink interfaces.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

FIG. 7 is a block diagram of a local target unit included in a satellite switch according to one embodiment.

Figure 1:
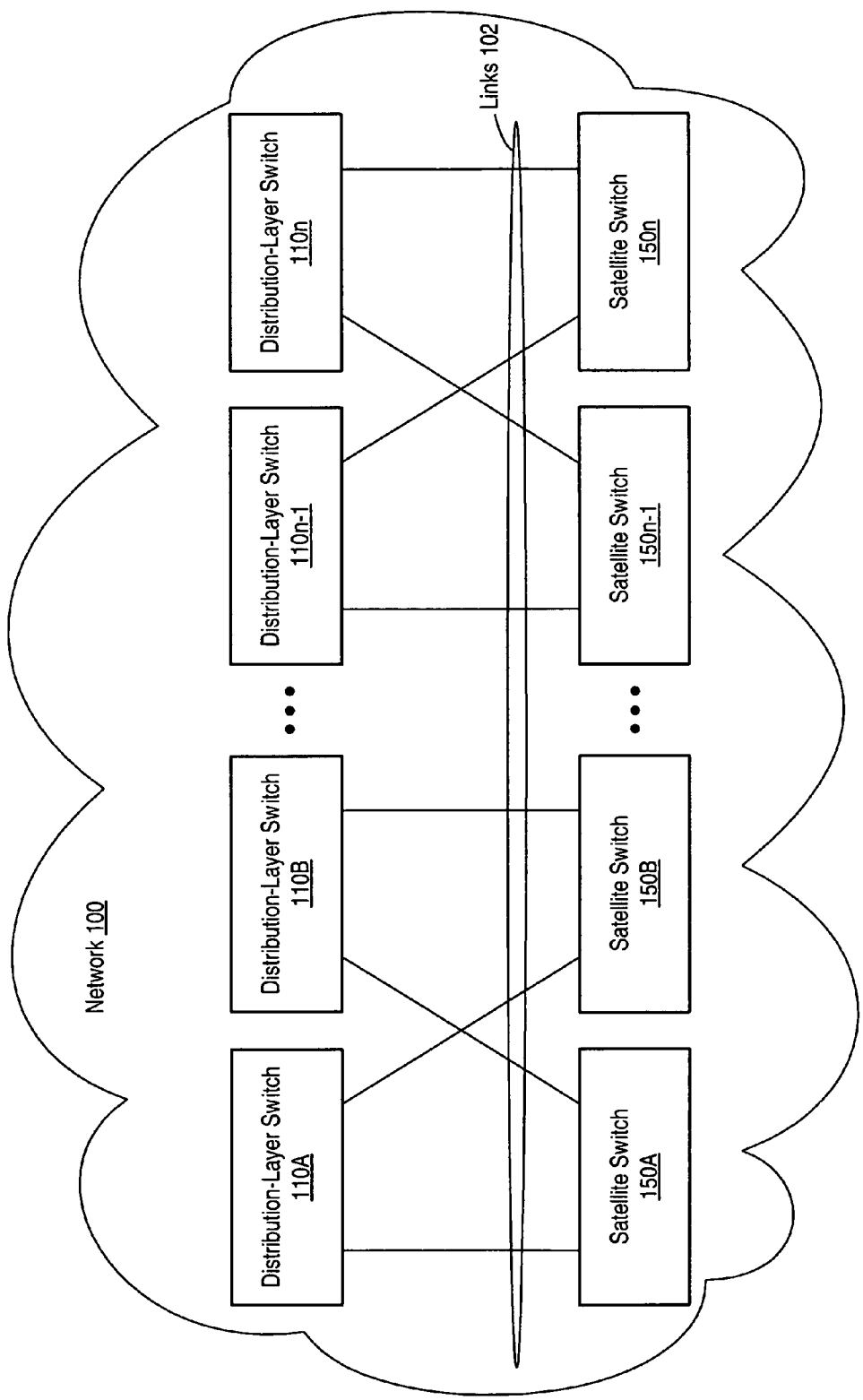
FIG. 1 is a block diagram of network that includes several distribution-layer switches and several access-layer satellite switches, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 shows a block diagram of network 100, which includes several distribution-layer switches 110A-110n (collectively, distribution-layer switches 110) and several satellite switches 150A-150n (collectively, satellite switches 150). Network 100 is configured as a multilayer campus area network that includes a core layer (not shown), a distribution layer that includes distribution-layer switches 110, and an access layer that includes satellite switches 150.

A distribution-layer switch is a switch that resides at the distribution-layer in the network. In other words, it is a switch with subtended access-layer switches. Distribution-layer switches 110 perform both OSI (Open Systems Interconnection) layer 2 and/or layer 3 switching.

A satellite switch is a switch that resides at the access-layer of the network. In many embodiments, satellite switches do not support local switching. For example, in some embodiments, satellite switches 150 rely on distribution-layer switches 110 to perform layer 2 forwarding functions used to determine how to switch the packets (examples of such embodiments are provided in FIGS. 7-10).

It is noted that throughout this disclosure, drawing features identified by the same reference number (e.g., distribution-layer switches 110A-110n) are collectively referred to by that reference number alone (e.g., distribution-layer switches 110). Furthermore, while the present invention is described in the context of the particular examples illustrated in FIGS. 1-12, the invention is not limited to use in these contexts.

Distribution-layer switches 110 are coupled to each other by network 100. Distribution-layer switches 110 can be coupled to each other directly (e.g., one distribution-layer switch is directly coupled to communicate with another distribution-layer switch) or by core-layer switches (not shown) (e.g., a pair of distribution-layer switches is coupled to communicate with each other via a core-layer switch).

Satellite switches 150 are each coupled to at least two distribution-layer switches 110 by links 102. Many of the distribution-layer switches are included to provide redundancy. For example, distribution-layer switches 110A and 110B are redundant with each other. If distribution-layer switch 110A fails, satellite switches 150A and 150B can still communicate with the distribution layer via distribution-layer switch 110B. Links 102 are Ethernet links in one embodiment.

The data received and forwarded by switches 110 and 150 is logically grouped into one or more packets. Throughout this disclosure, the term "packet" is used to refer to a logical grouping of information sent as a data unit over a transmission medium. Packets may include header and/or trailer information that surrounds user data contained in the data unit. For purposes of this disclosure, a "packet" may include a cell, datagram, frame, message, segment, or any other logical group of information.

In the illustrated example, each satellite switch (e.g. satellite switch 150A) is coupled to two distribution-layer switches (e.g., distribution-layer switches 110A and 110B) and each distribution-layer switch (e.g., distribution-layer switch 110A) is coupled to two satellite switches (e.g., satellite switches 150A and 150B). In other embodiments, each satellite switch can be coupled to a different number (other than 2) of distribution-layer switches and vice versa. Furthermore, the number of satellite switches per distribution-layer switch can differ from the number of distribution-layer switches per satellite switch. For example, each satellite switch can be coupled to three distribution-layer switches while each distribution-layer switch is coupled to four satellite switches. Additionally, the number of links 102 per satellite switch and/or per distribution-layer switch may vary within the same embodiment (e.g., one satellite switch can have three uplinks to the distribution-layer while another satellite switch has five uplinks). Network 100 can also include different numbers of satellite switches 150 and distribution-layer switches 110 (e.g., the number n of distribution-layer switches can differ from the number n of satellite switches).

Having multiple links 102 coupling each satellite switch 150 to the distribution layer provides redundancy in case a link 102 or distribution-layer switch 110 fails. For example, if the link coupling satellite switch 150B to distribution-layer switch 110B fails, or if distribution-layer switch 110B fails, satellite switch 150B is still able to communicate with the distribution layer via the link to distribution-layer switch 110A.

Each satellite switch 150 uses a port-based loadsharing scheme to utilize the redundant links coupling that satellite switch to the distribution layer. Implementation of the port-based loadsharing scheme involves each satellite switch selecting one of several links 102 on which to send a packet based on which satellite switch port (coupled to one or more network client devices, such as workstations) received that packet. For example, if satellite switch 150A receives a packet from a workstation, satellite switch 150A determines whether to send the packet to the distribution layer via the link to distribution-layer switch 110A or via the link to distribution-layer switch 110B based on which port received the packet. This determination is independent of which VLAN (Virtual Local Area Network) includes the workstation that sent the packet to satellite switch 150A.

Since port-based loadsharing does not depend on VLAN, all of the redundant links coupling a given satellite switch to the distribution layer can be used even if all of that satellite switch's ports are coupled to network client devices in the same VLAN. In other words, packets received via different satellite switch ports, each coupled to network client devices in the same VLAN, can be sent to the distribution layer via different links 102.

In some embodiments, a satellite switch 150 implements port-based loadsharing through the use of virtual linecards. The use of virtual linecards prevents bridging loops that could otherwise arise due to usage of the redundant links between satellite switches and the distribution layer. Virtual linecards are described in more detail below with respect to FIGS. 3A-3B.

The satellite switches 150 can be relatively simple switches that do not implement OSI layer 2 forwarding functionality. Instead, satellite switches 150 can depend on distribution-layer switches 110 to perform OSI layer 2 and/or layer 3 forwarding functions and to provide satellite switches 150 with forwarding information indicating the outcome of those forwarding functions. Satellite switches 150 then switch packets based on this forwarding information received from the distribution layer. In such embodiments, satellite switches 150 forward all packets received from network client devices to the distribution layer. The distribution layer determines how those packets will be forwarded through the network (e.g., by deciding whether to forward those packets to other distribution-layer switches 110, core-layer switches (not shown), or to a set of one or more network client devices via a particular satellite switch 150. Each distribution-layer switch 110 can perform forwarding functions to select ports in that distribution-layer switch 110 from which to output the packet. These forwarding functions can also select ports in a satellite switch 150 coupled to that distribution-layer switch 110 from which to output the packet.

In embodiments in which distribution-layer switches 110 perform OSI layer 2 and/or layer 3 forwarding for satellite switches 150, satellite switches 150 effectively act as additional ports of distribution-layer switches 110. For example, if satellite switch 150A includes eight ports, each coupled to one or more network client devices, that are configured to forward packet to distribution layer switch 110A via an uplink, the eight ports in satellite switch 150A are effectively acting as ports of distribution-layer switch 110A. The use of satellite switches 150, which can be less expensive than the distribution-layer switches if the satellite switches do not perform layer 2 forwarding, may provide decreased per-port cost relative to the increased features provided by the more-complex distribution-layer switches 110. Additionally, since more of the high-level functionality is concentrated in the distribution-layer switches 110, distribution-layer switches 110 provide a more centralized point of management for the layer 2 functionality of network 100. For example, distribution-layer switches 110 can be located in the same area of the campus linked by the campus area network. In contrast, the satellite switches 150 are likely to be distributed across the campus in various wiring closets. If the layer 2 functionality of the network is concentrated in the distribution-layer switches, patches and upgrades to this functionality can more easily and/or quickly be applied to the distribution-layer switches than they could be applied to both distribution-layer switches 110 and the access-layer satellite switches 150. For example, a technician could simply apply an upgrade to each of the distribution-layer switches, which can be located in the same building, without also having to go to each wiring closet on the campus to upgrade each access-layer satellite switch.

Figure 2:
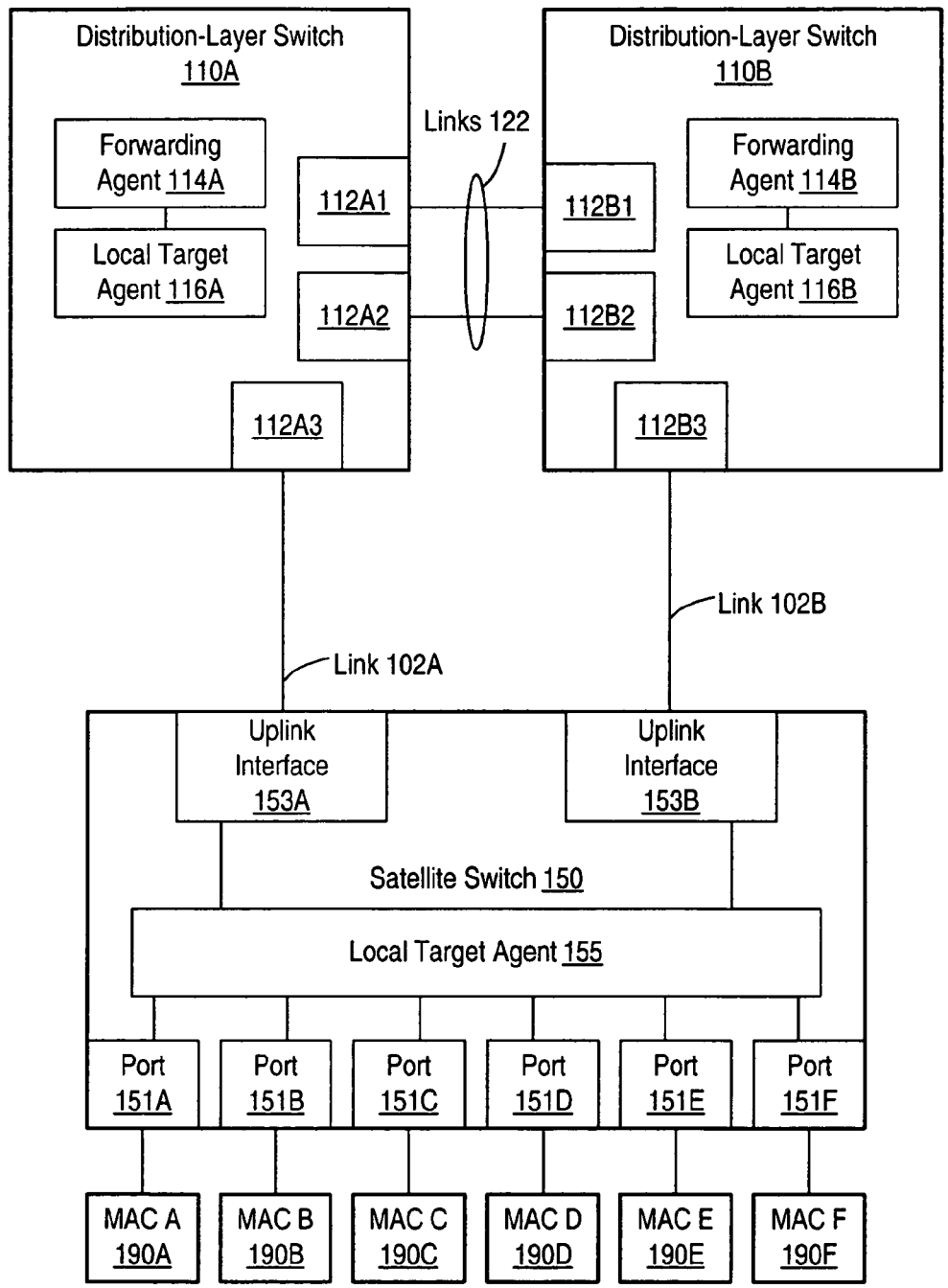
FIG. 2 illustrates a satellite switch coupled to the distribution layer by several links, according to one embodiment.

FIG. 2 illustrates satellite switch 150 coupled to the distribution layer by two links, link 102A and link 102B. Link 102A couples satellite switch 150 to distribution-layer switch 110A, while link 102B couples satellite switch 150 to distribution-layer switch 110B. In this example, distribution-layer switches 110A and 110B are coupled by redundant links 122.

Distribution-layer switches 110 each include several ports 112. In this example, distribution-layer switch 110A includes port 112A1 and 112A2, which interface to redundant links 122, and port 112A3, which interfaces to link 102A. Collectively, ports 112A1-112A3 are referred to as ports 112A. Distribution-layer switch 110B similarly includes ports 112B1 and 112B2, which interface to redundant links 122, and port 112B3, which interfaces to link 102B. Ports 112B1-112B3 are collectively referred to as ports 112B.

In the illustrated embodiment, satellite switch 150 includes two uplink interfaces 153A and 153B (collectively, uplink interfaces 153), local target agent 155, and six ports 151A-151F (collectively, ports 151). Local target agent 155 is an example of a means for conveying a packet between ports 151 and uplink interfaces 153. Ports 151 and uplink interfaces 153 are each examples of means for sending and receiving packets. Each port 151 is coupled to a respective one of network client devices 190A-190F. As used herein, a port in a satellite switch is an interface configured to send and receive packets to and from a network client device 190A-190F.

In some embodiments, network client devices 190 each include one or more of various types of computing devices. For example, network client devices 190 can each include one or more of: a switch, a router, a personal computer, a workstation, an Internet server, a network appliance, a handheld computing device such as a cell phone or PDA (Personal Data Assistant), or any other type of computing device. Network client devices 190A-190F each have a unique MAC (Media Access Control) identifier MAC A-MAC F.

Each uplink interface 153 is coupled to a respective one of links 102. Uplink interface 153A is coupled to communicate with distribution-layer switch 110A via link 102A, and uplink interface 153B is coupled to communicate with distribution-layer switch 110B via link 102B. As used herein, an uplink interface in a satellite switch is an interface configured to send and receive packets and associated forwarding information to and from a distribution-layer switch. Note that the configuration of uplink interfaces 153 and ports 151 can be substantially similar. In some embodiments, the same satellite switch interface can be selectively configured (and reconfigured) as either a port or an uplink interface.

It is noted that the network configuration shown in FIG. 2 is provided as an example. In other embodiments, more than one device 190 can be coupled to one of ports 151. Similarly, other embodiments can implement fewer or additional ports 151 and/or uplink interfaces 153.

To implement port-based loadsharing on links 102A and 102B, satellite switch 150 associates each port 151 with one of uplink interfaces 153. For example, satellite switch 150 can associate ports 151A, 151B, and 151D with uplink interface 153A, and ports 151C, 151E, and 151F with uplink interface 153B. In one embodiment, for each port 151, an association with one of uplink interfaces 153 can be created by setting a register associated with that port to a value that identifies the uplink interface 153 with which that port is associated.

Whenever a packet is received from one of devices 190 via one of ports 151, satellite switch 150 selects an uplink interface from which to output that packet based on which uplink interface is associated with the port received that packet. Thus, if a packet is received via port 151A and port 151A is associated with uplink interface 153A, satellite switch 150 outputs that packet to the distribution layer via uplink interface 153A.

In some embodiments, the associations between uplink interfaces 153 and port 151 can be updated at various times during the operation of satellite switch 150. For example, if link 102B fails and ports 151C, 151E, and 151F are associated with uplink interface 153B, satellite switch 150 may reassociate those ports with uplink interface 153A, which is coupled to non-failed link 102A.

When satellite switch 150 outputs a packet to the distribution layer via uplink interface 153A or uplink interface 153B, satellite switch 150 can also append information identifying which of ports 151 received that packet. This information can be used by distribution-layer switches 110 to learn the configuration of network 100 and to subsequently make forwarding decisions for satellite switches 150, as described in more detail below.

Each distribution-layer switch 110 includes a respective forwarding agent 114 and a respective local target agent 116. Forwarding agent 114A is configured to make forwarding decisions for distribution-layer switch 110A, and forwarding agent 114B is configured to make forwarding decisions for distribution-layer switch 110B. In one embodiment, forwarding agents 114 perform OSI layer 2 forwarding based on MAC identifiers. Forwarding agent 114B tracks which port 112B of distribution-layer switch 110B is used to communicate with a network client device having a particular MAC address by observing which port 112B receives packets sent by that network client device. For example, forwarding agent 114B can assign one or more unique forwarding indexes or other forwarding information to each port 112B. This assignment is tracked by local target agent 116B. If a packet is received from the network client device having a particular MAC address via port 112B3, forwarding agent 114B associates the forwarding index assigned to port 112B3 with the MAC address (e.g., the forwarding index is stored in a forwarding table entry indexed by the MAC address). If a subsequent packet is received that specifies that MAC address as its destination, forwarding agent 114B outputs the associated forwarding index to local target agent 116B. Since the forwarding index is assigned to port 112B3, local target agent 116B outputs the subsequent packet from port 112B3.

In this example, satellite switch 150 includes local target agent 155, which may operate similarly to local target agents 116. Unlike local target agents 116 in distribution-layer switches 110A and 110B, however, local target agent 155 does not include any layer 2 forwarding functionality. Instead, satellite switch 150 relies on distribution-layer switches 110A and 110B to make forwarding decisions. Each distribution-layer switch 110 configures satellite switch 150 to respond properly to forwarding decisions made by the forwarding agent 114 in that distribution-layer switch. For example, forwarding agents 114A and 114B in distribution-layer switches 110A and 110B can each assign a forwarding index to each port 151 in satellite switch 150. Local target agent 155 in satellite switch 150 maintains these assignments. Each distribution-layer switch 110 appends the appropriate forwarding index to each packet sent to satellite switch 150. When satellite switch 150 receives the packet and the associated forwarding index, local target agent 155 causes the packet to be output from the port (or ports) 151 associated with that forwarding index.

It is noted that local target agent 155 and local target agents 116 are each "local" in the sense that each forwards packets to a switch's output ports based on how forwarding indices are assigned to ports that are local to (i.e., physically included within) that switch. Thus, local target agent 116A maintains forwarding index assignments for ports 112A1-112A3 (collectively, ports 112A) within distribution-layer switch 110A. Similarly, local target agent 116B maintains forwarding index assignments for ports 112B1-112B3 (collectively, ports 112B) within distribution-layer switch 110B. Local target agent 155 in satellite switch 150 maintains forwarding index assignments for uplink interfaces 153 and ports 151. Local target agent 155 differs from local target agents 116 included in distribution-layer switches 110 because local target agent 155 stores forwarding index assignments generated by multiple different forwarding agents 114, each of which is included in a different physical switch than local target agent 155. In contrast, each local target agent 116 maintains forwarding index assignments generated by a single forwarding agent 114 that is included in the same switch as that local target agent 116.

As an example of how a forwarding agent 114 in a distribution-layer switch 110 can perform forwarding decisions for a satellite switch, assume forwarding agent 114A in distribution-layer switch 110A assigns forwarding index 1 to port 151B of satellite switch 150 (this assignment is maintained by local target agent 155 in satellite switch 150) and to port 112A3 of distribution-layer switch 110A (this assignment is maintained by local target agent 116A in distribution-layer switch 110A). Since forwarding index 1 identifies satellite switch port 151B and port 112A3, forwarding agent 114A will associate this forwarding index with the MAC addresses of devices that communicate with port 151B of satellite switch 150. For example, satellite switch 150 can append information identifying port 151B to a packet received via port 151B from device 190B. Forwarding agent 114A can then associate forwarding index 1 with MAC B of device 190B in response to receiving, via port 112A3, a packet and the information identifying port 151B from satellite switch 150. If distribution-layer switch 110A receives a subsequent packet addressed to MAC B, forwarding unit 114A causes index 1 to be appended to the packet due to index 1's association with MAC B. In response to index 1 being appended to the packet and index 1 being assigned to port 112A3, local target agent 116A in distribution-layer switch 110A outputs the packet and the appended forwarding index via port 112A3. Uplink interface 153A of satellite switch 150 receives the packet and appended forwarding index 1 via link 102A. In response to forwarding index 1 being assigned to port 151B, local target agent 155 outputs the packet to device 190B via port 151B. Satellite switch 150 may remove the appended forwarding index before outputting packets to devices 190.

Since each distribution-layer switch 110A and 110B assigns a forwarding index to each port 151 in satellite switch 150, the possibility exists that each distribution-layer switch will assign the same forwarding index to a different port or set of ports in satellite switch 150. For example, distribution-layer switch 110A can assign forwarding index 1 to port 151A while satellite switch 110B assigns forwarding index 1 to port 151C. In some embodiments, distribution-layer switches 110 are configured to negotiate forwarding index assignments between each other to avoid conflicting assignments. In other embodiments, satellite switch 150 is configured to handle forwarding indices in a way that allows conflicting assignments. In such embodiments, satellite switch 150 uses the same forwarding index differently depending on which uplink interface 153 received a packet to which that forwarding index was appended. For example, assuming the above conflicting assignment of forwarding index 1, if a packet to which forwarding index 1 is appended is received via uplink interface 153A, local target agent 155 uses the assignment generated by distribution-layer switch 110A and causes the packet to be output via port 151A. If instead a packet to which forwarding index 1 is appended is received via uplink interface 153B, local target agent 155 uses the assignment generated by distribution-layer switch 110B and causes the packet to be output via port 151C. Various techniques for handling conflicting forwarding index assignments in satellite switch 150 are described below with respect to FIGS. 7-10

Figure 3A:
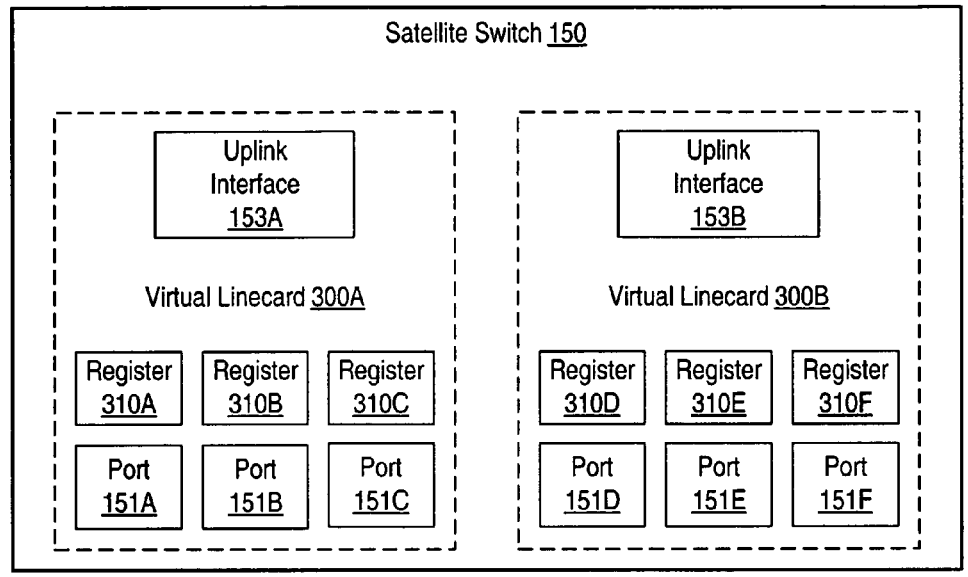
FIG. 3A is a block diagram of a satellite switch showing how a satellite switch is partitioned into several virtual linecards, each of which acts as a virtual linecard of a different distribution-layer switch, according to one embodiment.

In some embodiments, associations between satellite switch ports and satellite switch uplink interfaces are created by assigning each port and uplink interface to a virtual linecard. FIG. 3A is a block diagram of satellite switch 150 showing how satellite switch 150 is partitioned into several virtual linecards 300A and 300B (collectively, virtual linecards 300), each of which acts as a virtual linecard of a different distribution-layer switch 110. In this embodiment, satellite switch 150 associates each of ports 151 with one of uplink interfaces 153 by assigning each port and each uplink interface to a particular virtual linecard. For example, satellite switch 150 associates port 151A with uplink interface 153A by assigning port 151A to the same virtual linecard 300A as uplink interface 153A. As mentioned above, such an association between a port and an uplink interface allows the satellite-switch to implement port-based loadsharing.

In the example of FIG. 3A, each port 151A-151F is associated with a respective register 310A-310F. Each port 151 is assigned to a virtual linecard 300A or 300B by setting a value in the register 310 associated with that port. For example, port 151C can be assigned to virtual linecard 300A by setting register 310C to a value indicative of virtual linecard 300A. An example of the values that can be stored in registers 310 is described below with respect to FIG. 3C. Registers 310A-310F are examples of means for associating a port with an uplink interface.

Each virtual linecard 300 is associated with a particular distribution-layer switch 110. The number of virtual linecards 300 that can be implemented by satellite switch 150 depends on the number of uplink interfaces included in that satellite switch. The maximum number of virtual linecards 300 is implemented when each uplink interface 153 is coupled to a different distribution-layer switch. The minimum number of virtual linecards 300 is implemented when all uplink interfaces are coupled to the same distribution-layer switch (or when the only uplink interfaces not coupled to the same distribution-layer switch are unused). The assignment of uplink interfaces to virtual linecards thus depends on which distribution-layer switch each uplink interface is coupled to communicate with. For example, if uplink interface 153A is coupled to a different distribution-layer switch 110 than uplink interface 153B, then uplink interface 153A is assigned to a different virtual linecard than uplink interface 153B. If instead uplink interface 153A had been coupled to communicate with the same distribution-layer switch as uplink interface 153B, both uplink interfaces would be assigned to the same virtual linecard.

Satellite switch 150 can dynamically reassign ports 151 to different virtual linecards. For example, port 151A can be reassigned to virtual linecard 300B by setting register 310A to a value indicating virtual linecard 300B. Reassignment can occur for a variety of different reasons. In some embodiments, satellite switch 150 reassigns ports 151 to another virtual linecard in response to the failure of a link or distribution-layer switch. For example, if distribution-layer switch 110A, which is coupled to uplink interface 153A, fails, ports 151A-151C can be reassigned to virtual linecard 300B. Reassignment can also occur in response to traffic conditions in some embodiments. For example, if virtual linecard 300A is experiencing more traffic than virtual linecard 300B for an extended period of time, one or more ports currently assigned to virtual linecard 300A can be reassigned to virtual linecard 300B.

Figure 3B:
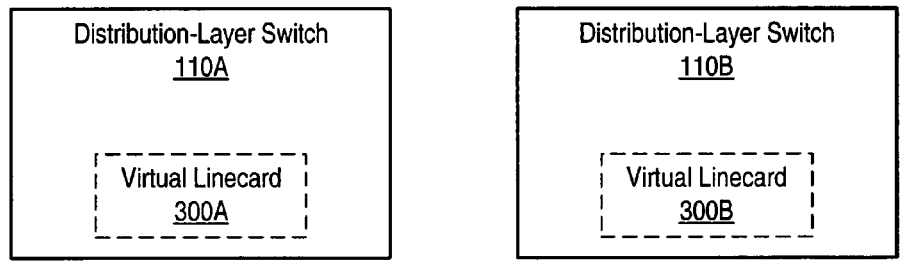
FIG. 3B shows how each virtual linecard implemented in the satellite switch behave as if it were physically included in the distribution-layer switch to which that virtual linecard is assigned, according to one embodiment.

As shown in FIG. 3B, each virtual linecard of satellite switch 150 can be logically viewed as a linecard of a respective distribution-layer switch. While both virtual linecards share the same local target agent (as shown in FIG. 2) and are implemented in the same physical access-layer satellite switch, the virtual linecards behave as if they are physically included in different distribution-layer switches.

Each distribution-layer switch 110 is configured to control the satellite switch ports and uplink interfaces included in a respective virtual linecard within satellite switch 150. For example, distribution-layer switch 110A controls ports 151A-151C and uplink interface 153A in virtual linecard 300A. A distribution-layer switch 110 controls satellite switch ports and uplink interfaces by, among other things, assigning a forwarding index to each port and uplink interface in that virtual linecard and by making forwarding decisions for packets received via satellite switch ports in that virtual linecard. It is noted that a distribution-layer switch can control a virtual linecard in each of several satellite switches.

The use of virtual linecards allows conflicting forwarding index assignments to be handled by providing local target agent 155 (as shown in FIG. 2) with a mechanism for distinguishing between forwarding assignments generated by different distribution-layer switches. For example, local target agent 155 can maintain separate forwarding index assignments for each virtual linecard. Whenever a packet is received from the distribution layer, local target agent 155 can decide which set of forwarding index assignments to use based on which virtual linecard includes the uplink interface that received the packet. In an alternative embodiment, forwarding index assignments for the different virtual linecards are collectively maintained, and a virtual-linecard-specific mask is used to handle conflicting forwarding index assignments (this embodiment is described with respect to FIGS. 7-8). In yet another embodiment, satellite switch 150 may map a forwarding index into a virtual-linecard-specific forwarding index space dependent on which virtual linecard includes the uplink interface that received the forwarding index from the distribution layer (this embodiment is described with respect to FIGS. 9A-10).

Using virtual linecards can also prevent erroneous packet deliveries and/or bridging loops that might otherwise occur if copies of the same packet are received from the distribution layer via more than one of the satellite switch's uplink interfaces. For example, assume port 151B receives from device 190B a packet having a destination MAC address that the distribution-layer switch forwarding agent 114A has not yet been associated with a port (e.g., the device having that MAC address may not have sent any packets yet) and that all ports 151 in satellite switch 150 are associated with the same VLAN (and thus all of ports 151 are identified by the flood index for that VLAN). Because port 151B is associated with uplink 153A by their inclusion in the same virtual linecard, satellite switch 150 outputs the packet via uplink interface 153A. When distribution-layer switch 110A (as shown in FIG. 2) receives the packet, forwarding agent 114A outputs the flood index for the VLAN in which device 190B is included. This flood index may cause local target logic 116A in distribution-layer switch 110A to output the packet from port 112A3 and from one of ports 112A1 and 112A2. When distribution-layer switch 110B receives the packet, its forwarding agent 114B may also append a flood index for the VLAN to the packet, which in turn causes local target logic 116B to output the packet and flood index via port 112B3 to satellite switch 150. Thus, satellite switch 150 may receive two copies of the packet—one copy via uplink interface 153A and the other copy via uplink interface 153B. If the satellite switch does not handle the packet differently depending on which virtual linecard received the packet, and if all of the satellite switch ports are assigned to the same VLAN, local target agent 155 will respond to the flood index appended to each copy of the packet by outputting each copy of the packet from all of the ports 151 (other than the original port that received the packet from device 190B). If a sequence of packets is being sent, this could result in packets being output to devices 190 out of order (e.g., this situation could arise if one uplink interface receives a copy of a particular packet in the sequence before the other uplink interface receives a copy of an earlier packet in the sequence). Additionally, the packet could be resent to distribution layer (e.g., the copy received via uplink interface 153A could be output via uplink interface 153B and the copy received via uplink interface 153B could be output via uplink interface 153A), causing undesirable bridging loops.

To avoid these potential problems, forwarding of a packet from one of uplink interfaces 153 to one of ports 151 is conditioned on whether the uplink interface that received the packet is included in the same virtual linecard as the port. If the uplink is included in the same virtual linecard as the port, the packet can be forwarded to the port. Otherwise, the packet cannot be forwarded to the port. Thus, using the above example, when the copy of the packet and the associated flood index are received via uplink interface 153A, local target agent 155 only outputs the packet from ports 151A and 151C, which are included in the same virtual linecard as uplink interface 153A (port 151B, which originally received the packet from device 190B, and uplink interface 153A, which received the packet from the distribution layer, are excluded from the set of destinations by normal forwarding techniques). Similarly, when the copy of the packet and the associated flood index are received via uplink interface 153B, local target agent 155 only outputs the packet from ports 151D-151F included in the same virtual linecard as uplink interface 153B (again, uplink interface 153B, which received the packet from the distribution layer, is excluded from the set of destinations by normal forwarding techniques). Thus, through the use of virtual linecards, bridging loops are avoided and each network client device 190 is only sent one copy of the packet.

Figure 3C:
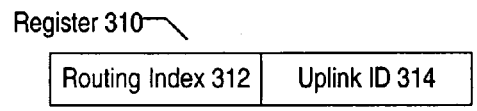
FIG. 3C shows an example of the content of a port-specific register that assigns a satellite switch port to a particular virtual linecard, according to one embodiment.

FIG. 3C shows an example of the content of a port-specific register 310 used to assign a port 151 to a particular virtual linecard. In this example, register 310 includes a value 312 indicative of the forwarding index assigned to the port 151 with which register 310 is associated. This forwarding index can be assigned by a forwarding agent 114 in a distribution-layer switch 110 (since each port can only be included in one virtual linecard at a given time, only one distribution-layer switch can assign a forwarding index to that port at any given time). Register 310 also includes a value 314 identifying the uplink with which the port 151 is associated. This value 314 assigns the port 151 to the same virtual linecard as the identified uplink interface and also assigns that uplink interface to the same virtual linecard as the port.

Figure 4:
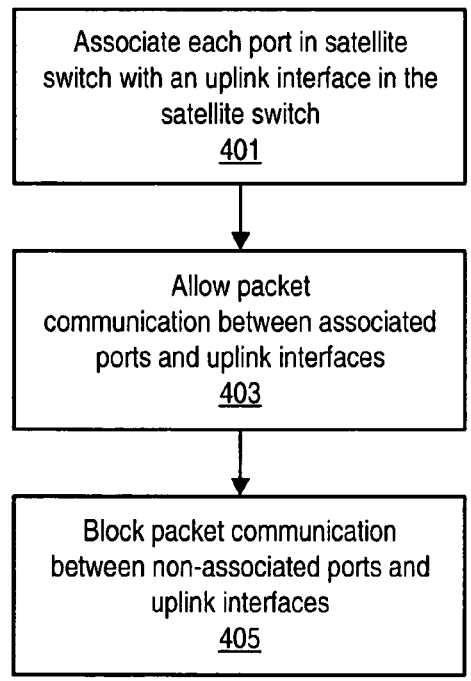
FIG. 4 is a flowchart of one embodiment of a method of performing port-based loadsharing in a satellite switch.

FIG. 4 is a flowchart of one embodiment of a method of performing port-based loadsharing in a satellite switch. At 401, each of the satellite switch's ports are associated with one of the satellite switch's uplink interfaces. This involves setting a register associated with each port to a value identifying the uplink interface with which that port is to be associated in some embodiments. Associating satellite switch ports with satellite switch uplink interfaces is independent of VLAN; a port coupled to devices in one VLAN can be associated with the same uplink interface as another port that is coupled to devices in a different VLAN.

In one embodiment, an association between a port and an uplink interface is created by assigning the port to the same virtual linecard as the uplink interface with which the port is to be associated. In one embodiment, if fewer than all of the ports in a satellite switch are used (e.g., coupled to send and receive packets to and from devices), associations with uplink interfaces are not created for the unused ports. Similarly, some embodiments do not associate any ports with unused uplink interfaces.

As indicated at 403, packet communication is allowed between associated ports and uplink interfaces. For example, if a packet is received from a network client device via a port, that packet may be forwarded to the distribution layer by the uplink interface with which the receiving port is associated. If a packet and its associated forwarding information (e.g., a forwarding index) are received via an uplink interface, and if that forwarding information indicates that the packet should be output from a particular port, the packet will be output from the indicated port as long as the port is associated with the uplink interface.

Packet communication between non-associated ports and uplink interfaces is blocked, as indicated at 405. For example, if a packet is received via particular port, that packet will not be output via any uplink interface that is not associated with the port that received the packet. Similarly, if a packet and associated forwarding information are received via an uplink interface, that packet will not be output via any port or uplink interface that is not associated with that uplink interface, even if the forwarding information identifies non-associated ports and/or uplink interfaces.

Figure 5:
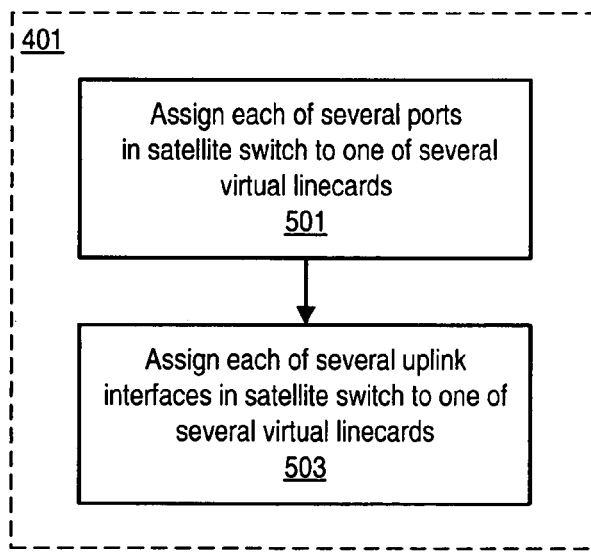
FIG. 5 is a flowchart of a method of associating each of several satellite switch ports with a satellite switch uplink interface, according to one embodiment.

FIG. 5 shows how satellite switch ports can be associated with satellite switch uplink interfaces (as shown in function 401 of FIG. 4) in order to implement port-based loadsharing. At 501, each port in a satellite switch is assigned to a virtual linecard. Each uplink interface is assigned to a virtual linecard at 503. Together, functions 501 and 503 operate to create an association between a port and an uplink interface; if a port is assigned to the same virtual linecard as an uplink interface, that port is associated with that uplink interface for purposes of port-based loadsharing. If a port is assigned to a different virtual linecard than an uplink interface, that port is not associated with that uplink interface for port-based loadsharing purposes. A port can be assigned to a virtual linecard by setting a register value associated with the port to identify a particular uplink interface. An uplink interface is assigned to a virtual linecard based on which ports have registers identifying that uplink interface and which other uplink interfaces, if any, are coupled to communicate with the same distribution-layer switch as that uplink interface. For example, an uplink interface is assigned to the same virtual linecard as any port whose associated register identifies the uplink interface and to the same virtual linecard as any other uplink interface coupled to communicate with the same distribution-layer switch.

Figure 6A:
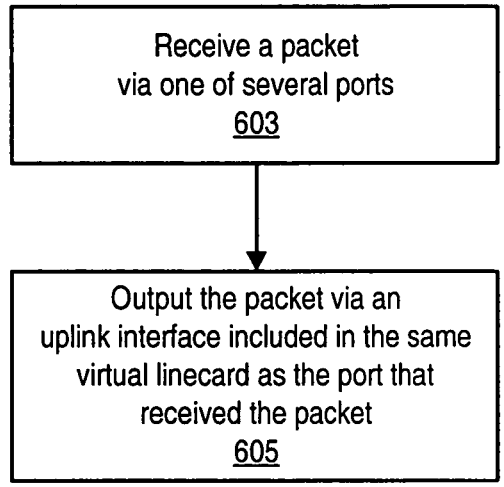
FIG. 6A is a flowchart of a method of forwarding a packet from a satellite switch to the distribution layer, according to one embodiment.

FIG. 6A is a flowchart of a method of forwarding a packet from a satellite switch to a distribution-layer switch, according to one embodiment. In this example, a satellite switch receives a packet via one of several ports, as indicated at 603. Dependent on which port received the packet, an uplink interface is selected from which to output the packet to the distribution layer. An uplink interface in the same virtual linecard as the port that received the packet is selected, as indicated at 605. The packet is blocked from being output from any uplink interface that is not included in the same virtual linecard as (or otherwise associated with) the port that received the packet.

Figure 6B:
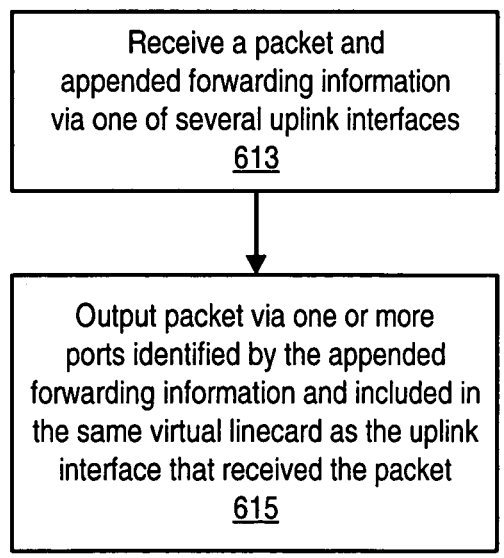
FIG. 6B is a flowchart of a method of forwarding a packet from a satellite switch to a client device, according to one embodiment.

FIG. 6B is a flowchart of a method of forwarding a packet from a satellite switch to a client device, according to one embodiment. Here, a packet and appended forwarding information (e.g., a forwarding index as described above) are received from the distribution-layer-via an uplink interface, as indicated at 613. The packet is then output from one or more ports (which are identified by port-identifying information, maintained within the satellite switch, that is selected by the appended forwarding information) included in the same virtual linecard as the uplink interface that received the packet, as indicated at 615. The packet is blocked from being output from any port that is not included in the same virtual linecard as (or otherwise associated with) the uplink interface that received the packet, even if such ports are included in the port-identifying information selected by the forwarding information appended to the packet.

FIG. 7 is a block diagram of local target agent 155 included in satellite switch 150. In this example, local target agent 155 includes local target table 756 and local target masks 757. Local target table 756 stores associations between groups of one or more ports and forwarding indices generated by forwarding agents 114A and 114B of distribution-layer switches 110A and 110B (as shown in FIG. 2). It is noted that in other embodiments, local target table 756 may store associations between ports and forwarding indices generated by more than two different distribution-layer switches 110.

In this example, the associations are stored as bitmaps that are indexed by the various forwarding indices, Index 1-Index 12 (other embodiments can use significantly more forwarding indices). Each bitmap includes a bit for each port 151A-151F and uplink interface 153A-153B. When a bit is set in a particular bitmap, it indicates that the corresponding port or uplink interface is associated with the forwarding index that indexes that bitmap in the local target table 756. For example, in the bitmap associated with Index 1, the bit corresponding to port 151A is set, indicating that Index 1 is associated with port 151A. When a packet having forwarding information that includes Index 1 is received via an uplink interface, local target agent 155 looks up which ports correspond to Index 1 in local target table 756. Since local target table indicates that port 151A is associated with Index 1 in local target table 756, local target agent causes that packet to be output from port 151A (assuming that the uplink interface is in the same virtual linecard as (or otherwise associated with) port 151A).

Each distribution-layer switch can be configured to only generate forwarding indices for ports included in the virtual linecard associated with that distribution-layer switch. For example, distribution-layer switch 110A (as shown in FIG. 2) is configured to only generate forwarding indices for ports 151A, 151B, and 151C, which are included in virtual linecard 300A, and distribution-layer switch 110B (as shown in FIG. 2) is configured to only generate forwarding indices for ports 151D, 151E, and 151F, which are included in virtual linecard 300B. Local target agent 155 can enforce this rule by preventing each distribution-layer switch from setting bits in local target table 756 that identify ports that are not included in a virtual linecard controlled by that distribution-layer switch.

Different distribution-layer switches can associate the same forwarding index with a different port or group of ports. For example, as shown in FIG. 7, distribution-layer switch 110A may assign Index 2 to port 151B, and distribution-layer switch 110B can assign Index 2 to a multicast group that includes ports 151D and 151F. In one embodiment, local target agent 155 logically ORs the distribution-layer switch-specific bitmaps associated with the same forwarding index, and thus Index 2 has a resulting bitmap in which the bits for ports 151B, 151D, and 151F are set. The distribution-layer switches 110 can, in at least some embodiments, use the same forwarding index as a flood index. For example, both distribution-layer switch 110A and distribution-layer-switch 110B can use Index 8 as a flood index for a VLAN that includes network client devices coupled to ports 151A, 151B, 151C, and 151E. Similarly, both distribution-layer switches can use Index 9 as a flood index for a VLAN that includes network client devices coupled to ports 151D and 151F. The bitmap for each VLAN-specific flood index will include each port that is coupled to a network client device 190 in that VLAN, regardless of which virtual linecard includes that port.

In FIG. 7, twelve forwarding indices and their associated bitmaps are shown in local target table 756. It is noted that other embodiments can support different numbers of forwarding indices than are shown here, and that the bitmaps illustrated in this figure are merely provided as an example. In this example, Index 1 is associated with a bitmap that selects port 151A in virtual linecard 300A. No ports in virtual linecard 300B are selected by Index 1. Index 2 selects port 151B in virtual linecard 300A and ports 151D and 151F in virtual linecard 300B. Index 3 selects port 151C in virtual linecard 300A and port 151D in virtual linecard 300B (e.g., because distribution-layer switch 110A assigned Index 3 to port 151C and distribution-layer switch 110B assigned Index 3 to port 151D). Index 4 selects a multicast group that includes ports 151B and 151C in virtual linecard 300A. Index 4 also selects port 151E in virtual linecard 300B. Index 5 selects port 151F in virtual linecard 300B. Index 6 is unused in this example. Index 7 selects a multicast group that includes ports 151A and 151C in virtual linecard 300A. In this example, Index 8 is a flood index for a VLAN. Ports 151A, 151B, 151C, and 151E are included in that VLAN. Index 9 is the flood index for another VLAN, which includes ports 151D and 151F. Index 10 selects uplink interface 153B in virtual linecard 300B. Index 11 selects uplink interface 153A in virtual linecard 300A.

Local target agent 155 includes a storage 757 that stores a local target mask for each virtual linecard (VLC) 300 implemented by satellite switch 150. The local target mask for virtual linecard 300A selects, ports 151A-151C and uplink interface 153A. The local target mask for virtual linecard 300B selects ports 151D-151F and uplink interface 153B.

In situations in which the same forwarding index is used differently by different distribution-layer switches, local target agent 155 uses local target masks 757 to modify the bitmap associated with that forwarding index in order to isolate the bitmap generated by a particular distribution-layer switch. For example, if a packet having forwarding Index 2 is received via uplink interface 153A from distribution-layer switch 110A, local target agent 155 may retrieve the bitmap associated with Index 2 from local target table 756 and select the mask associated with the virtual linecard 300A that includes uplink interface 153A from local target masks 252. Local target agent 155 then bitwise logically ANDs the mask associated with virtual linecard 300A with the bitmap associated with Index 2. The resulting bitmap has a single set bit, associated with port 151B, (the bits associated with ports 151D and 151F are cleared by the application of the mask associated with virtual linecard 300A). Based on this resulting bitmap, local target agent 155 causes the received packet to be output from port 151B. If instead the packet had been received via uplink interface 153B, local target agent 155 would have selected and applied the mask associated with virtual linecard 300B, which includes uplink interface 153B, to the bitmap selected by Index 2. In this situation, the bits associated with ports 151D and 151F would be set in the resulting bitmap and the bit associated with port 151B would be cleared. In response, local target agent 155 would have caused the packet to be output from ports 151D and 151F. Local target agent 155 can process other forwarding indices similarly.

In alternative embodiments, local target agent 155 can maintain a separate local target table 756 for each virtual linecard implemented by that satellite switch. Local target agent 155 selects which local target table to access based on which uplink interface received a packet and appended forwarding index. Local target agent 155 uses the appended forwarding index to select a bitmap in the local target table associated with the virtual linecard that includes the uplink interface that received the packet to which the forwarding index is appended. In such an embodiment, local target masks 757 may not be needed.

Figure 8:
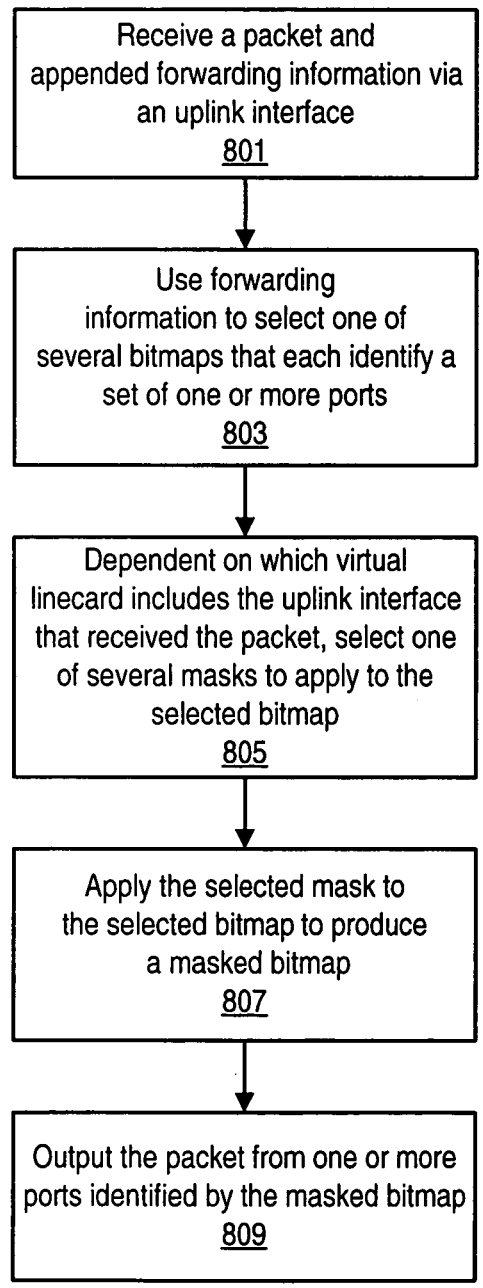
FIG. 8 is a flowchart of a method of operating a satellite switch that implements port-based loadsharing by using virtual-linecard-specific masks to ensure that ports and uplinks included in different virtual linecards do not directly communicate packets, according to one embodiment.

FIG. 8 is a flowchart of a method of operating a satellite switch that implements port-based loadsharing by using virtual-linecard-specific masks to ensure that ports and uplinks included in different virtual linecards do not directly communicate packets. At 801, a satellite switch receives a packet and appended forwarding information (e.g., a forwarding index). As mentioned above, in at least some embodiments, the satellite switch lacks any OSI Layer 2 forwarding logic; as a result, the satellite switch relies on a distribution-layer switch to performing Layer 2 forwarding operations and to append forwarding information to each packet to indirectly indicate the ports selected by the forwarding operations.

At 803, the satellite switch uses the forwarding information appended to the packet to select one of several bitmaps (or other sets of port-identifying information usable to identify the ports from which the packet should be output) maintained within the satellite switch. The appended forwarding information identifies the bitmap to select (e.g., an appended forwarding index can select a bitmap in a lookup table). In one embodiment, each bitmap includes a bit for each port and each uplink interface in the satellite switch. If a particular bit in a bitmap selected by the forwarding information is set, it indicates that the port or uplink represented by that bit is a destination port or uplink of the packet (assuming that port or uplink is included in the same virtual linecard as the uplink that received the packet).

Dependent on which virtual linecard includes the uplink interface that received the packet, at 805 one of several masks is selected to apply to the bitmap or other port-identifying information selected at 803. For example, each virtual linecard can have an associated mask that, when applied to a bitmap, selects only those ports and uplink interfaces included in that virtual linecard. By masking out ports and uplink interfaces identified in the bitmap but not included in the same virtual linecard as the uplink interface that received the packet, port-identifying information identified by the same forwarding information but generated for another virtual linecard can be removed. This allows different distribution-layer switches to use the same forwarding information to identify different sets of port-identifying information, which can simplify distribution-layer switch overhead. For example, distribution-layer switches can assign forwarding information to identify sets of port-identifying information independently without needing to coordinate assignments with each other.

At 807, the mask, selected at 805, is applied to the bitmap, selected at 803, to produce a masked bitmap. The masked bitmap identifies the destination ports for the packet. These destination ports are those ports that are both identified in the bitmap selected by the forwarding information and included in the same virtual linecard as the uplink interface. The packet is then output from the ports identified by the masked bitmap at 809.

Figures 9A, 9B:
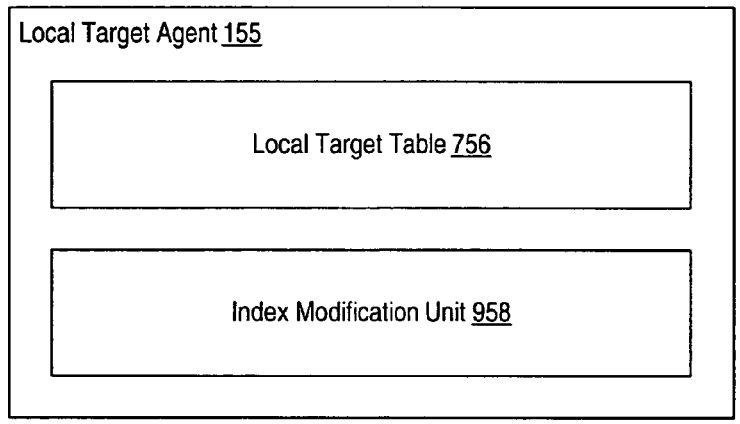
FIG. 9A is a block diagram of a local target unit included in a satellite switch, according to another embodiment.
FIG. 9B illustrates how forwarding indices generated by a distribution-layer switch are modified by the satellite switch in order to ensure that ports and uplinks included in different virtual linecards do not directly communicate packets, according to one embodiment.

Other embodiments can handle conflicting forwarding information assignments without using masks. FIG. 9A is a block diagram of a local target agent 155 included in a satellite switch, according to another embodiment. In this embodiment, index modification unit 958 in local target agent 155 is configured to modify the forwarding indices received with packets from the distribution-layer switches before using the forwarding indices to select bitmaps in the local target table. The modification to apply to a given forwarding index depends on which distribution-layer switch generated the forwarding index. After forwarding index modification, no forwarding indices input to local target table 756 are shared between multiple distribution-layer switches. For example, distribution-layer switch 110A may assign Index 1 to one port and distribution-layer switch 110B may assign Index 1 to a different port. Index modification unit 958 can be configured to remap Index 1 to Index 11 if Index 1 is appended to a packet received from distribution-layer switch 110A and to not remap Index 1 if Index 1 is appended to a packet received from distribution-layer switch 110B. Index 11 can select the port-identifying information (e.g., a bitmap in local target table 756) associated with Index 1 by distribution-layer switch 110A and Index 1 can select the port-identifying information associated with Index 1 by distribution-layer switch 110B.

FIG. 9B provides an example of how forwarding indices generated by two distribution-layer switches, switches 110A and 110B, can be modified by index modification unit 958 in satellite switch 150. Here, forwarding indices are remapped in blocks of 4K. There are five 4K-sized regions of forwarding indices used by each distribution-layer switch: the region beginning at 0x8000 corresponds to unicast flood, the region beginning at 0x9000 corresponds to multicast flood without router, the region beginning at 0xA000 corresponds to unicast flood protection, the region beginning at 0xC000 corresponds to multicast flood, the region beginning at 0xE000 corresponds to multicast flood, and the regions beginning at 0xB000, 0xD000, and 0xF000 are unused. In this example, the regions corresponding to broadcast flood and multicast flood without router always have the same port selections, and thus, for each distribution-layer switch, these two regions (beginning respectively at 0x8000 and 0x9000) are mapped to the same region within the satellite switch.

For the indices generated by distribution-layer switch 110A, index modification unit 958 maps the regions beginning at 0x8000 and 0x9000 (which each have identical port selections, as described above) to the region beginning at 0x8000. For distribution-layer switch 110B, these same regions are mapped to the region beginning at 0xC000. Index modification unit 958 maps indices in the region beginning at 0xA000 and generated by distribution-layer switch 110A to the region beginning at 0x9000. Indices generated by distribution-layer switch 110B in the same region are remapped to the region beginning at 0xD000. Index modification unit 958 maps indices in the region beginning at 0xC000 and generated by distribution-layer switch 110A to the region beginning at 0xA000. Indices generated by distribution-layer switch 110B in the same region are remapped to the region beginning at 0xE000. Index modification unit 958 maps indices in the region beginning at 0xE000 and generated by distribution-layer switch 110A to the region beginning at 0xB000. Indices generated by distribution-layer switch 110B in the same region are remapped to the region beginning at 0xF000. The remapped indices are then used by local target agent 155 to index into a local target table. Since each remapped index is unique to a given virtual linecard, there is no need for local target masks like those shown in FIG. 7.

In embodiments such as the one described with respect to FIGS. 9A and 9B, the coordination of forwarding index assignment can be simplified by restricting the number of distribution-layer switches that can be simultaneously coupled to a given satellite switch. For example, in one embodiment, no more than two distribution-layer switches are allowed to couple to the same satellite switch at a given time. This allows the local target agent 155 in the satellite switch to be configured to more efficiently handle remapping or otherwise modifying forwarding indices generated by the different distribution-layer switches. For example, index modification unit 958 will not need to be able to generate and apply mappings for variable numbers of distribution-layer switches. Thus, instead of including complex logic and/or software configured to handle two, three, four, or more distribution-layer switches, index modification unit 958 can be configured with simpler and/or more efficient logic and/or software configured to handle at most two distribution-layer switches.

Figure 10:
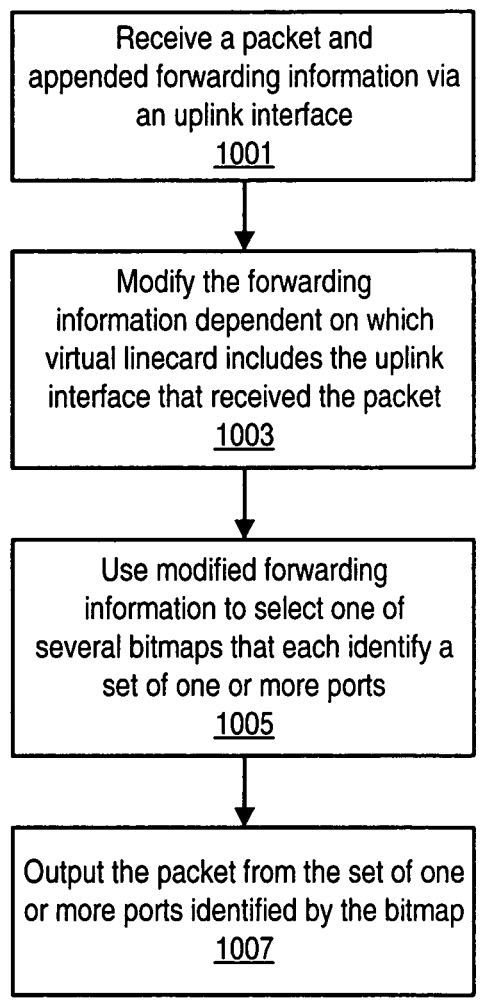
FIG. 10 is another flowchart of a method of operating a satellite switch that implements port-based loadsharing to ensure that ports and uplinks included in different virtual linecards do not directly communicate packets, according to another embodiment.

FIG. 10 is another flowchart of a method of operating a satellite switch that implements port-based loadsharing and that handles conflicting forwarding index assignments by mapping each distribution-layer switches forwarding index assignments to a particular range of forwarding indices. At 1001, a packet and appended forwarding information (e.g., a forwarding index) are received via an uplink interface in a satellite switch. The forwarding information is modified dependent upon which virtual linecard includes the uplink interface that received the packet, as shown at 1003. For example, if the forwarding information is a forwarding index, the forwarding index can be remapped differently depending on the virtual linecard. In the example of FIG. 9, a forwarding index in the region 0x8000 can be remapped to either a corresponding forwarding index in the region 0x8000 if the forwarding index is received by an uplink interface in the virtual linecard controlled by distribution-layer switch 110A or to an index in the region 0xC000 if the forwarding index is received by an uplink interface in the virtual linecard controlled by distribution-layer switch 110B.

At 1005, the modified forwarding information (e.g., the remapped forwarding index) is used to select one of several bitmaps or other sets of port-identifying information. Each bitmap or other set of port-identifying information identifies a set of one or more ports. The packet to which the forwarding information is appended is output from the one or more ports identified in the bitmap or other port-identifying information selected by the modified forwarding information, as indicated at 1007.

The embodiment described with respect to FIGS. 7 and 9A-9B allow distribution-layer switches to assign forwarding indices to satellite switch ports without needing to coordinate forwarding index assignment with other distribution-layer switches. Other embodiments involve distribution-layer switches 110A and 110B that are coupled to a particular satellite switch 150 coordinating forwarding index assignment for that satellite switch among each other. This coordination can take place directly between distribution-layer switches that are coupled to the same satellite switch or indirectly by coordinating with a centralized forwarding index manager (e.g., implemented in the local target agent of the satellite switch for which the forwarding index assignment is being coordinated). In one such embodiment, when a distribution-layer switch is coupled to a satellite switch, the distribution-layer switch determines the local target index range used for satellite switch ports controlled by other distribution-layer switches. The distribution-layer switch can, for example, query the local target agent in the satellite switch for information about which ranges of forwarding indices are currently assigned to other distribution-layer switches. The distribution-layer switch then allocates its own range of local target indices by requesting a block of local target indices from the local target agent. If this block overlaps with any range of local target indices used by another distribution-layer switch, the distribution-layer switch requests another range of local target indices from the local target agent (the overlapping block is not released, however). This process repeats until the distribution-layer switch finds a non-overlapping block of local target indices or until the local target manager no longer has any free local target indices. Upon allocating a range of local target indices (or upon discovering that no non-overlapping range exists), the overlapping blocks are released back to the local target agent.

Figures 11A, 11B:
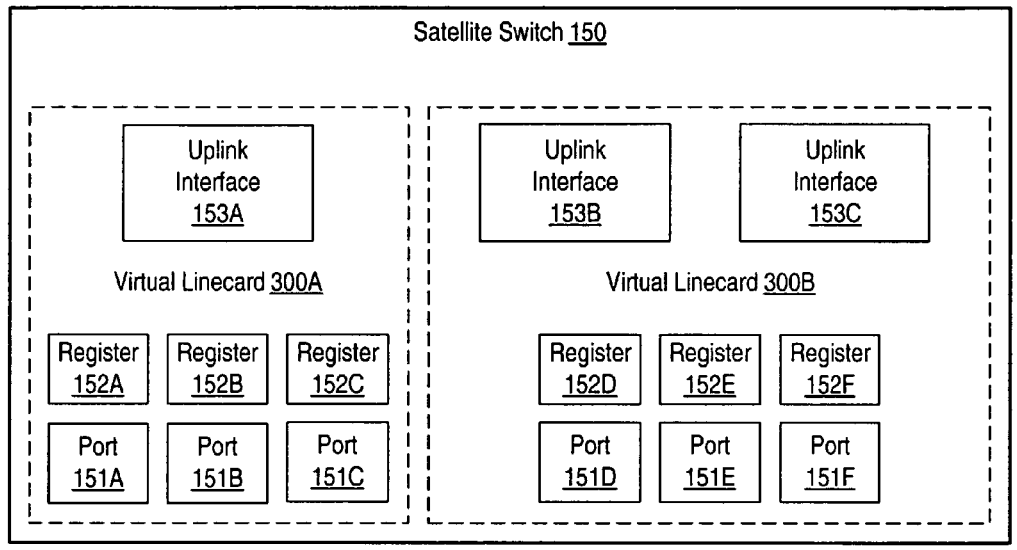
FIG. 11A is a block diagram of a satellite switch in which multiple uplinks are assigned to the same virtual linecard, according to one embodiment.
FIG. 11B illustrates local target masks useable in a satellite switch in which multiple uplinks are assigned to the same virtual linecard, according to one embodiment.

FIG. 11A is a block diagram of a satellite switch in which multiple uplinks are assigned to the same virtual linecard, according to one embodiment. In this embodiment, the assignment of uplink interfaces 153 and ports 151 to virtual linecards 300 is the same as that shown in FIG. 3A, except that an additional uplink interface 153C has been assigned to virtual linecard 300B. The two uplink interfaces 153B and 153C included in virtual linecard 300B form an uplink group to the same distribution-layer switch (e.g., distribution-layer switch 110B as shown in FIG. 2). Multiple uplink interfaces can be coupled to the same distribution-layer switch to provide additional bandwidth and/or reliability between that distribution-layer switch and satellite switch 150.

For port-based loadsharing purposes, uplink interfaces 153B and 153C are associated with ports 151D-151F by virtue of being assigned to the same virtual linecard 300B. Assignment to the same virtual linecard can involve: setting a register associated with each of ports 151D-151F to a value identifying either or both uplink interfaces 153B and 153C, setting a register associated with each of uplink interfaces 153B and 153C to a value indicating that both uplink interfaces are coupled to the same distribution-layer switch, and/ or associating the same local target mask with each uplink interface 153B and 153C. As shown in FIG. 11B, the local target mask associated with uplink interfaces 153B and 153C selects all of the ports and uplink interfaces assigned to virtual linecard 300B: port 151D, port 151E, port 151F, uplink interface 153B, and uplink interface 153C.

Traffic in virtual linecard 300B can be configured so that packets received via a particular port 151D-151F are forwarded to the distribution layer via a single uplink interface 153B or 153C. For example, a register (e.g., such as register 310D shown in FIG. 3A) associated with port 151D can be set to a value identifying uplink interface 153B, and registers respectively associated with ports 151E-151F can be set to a value identifying uplink interface 153C. Thus, whenever a packet is received via port 151D, the packet will be forwarded to the distribution layer via uplink interface 153B, and whenever a packet is received by either port 151E or 151F, the packet will be forwarded to the distribution layer via uplink interface 153C. Alternatively, the uplink interface from which to forward packets received via any of ports 151D-151E can be dynamically selected from uplink interfaces 153B and 153C (e.g., the selection can be random or based on past forwarding history). The distribution-layer switch coupled to both uplink interfaces 153B and 153C is configured to send packets to satellite switch 150 in such a way that each packet is sent to only one of the uplink interfaces 153B-153C.

Figure 12:
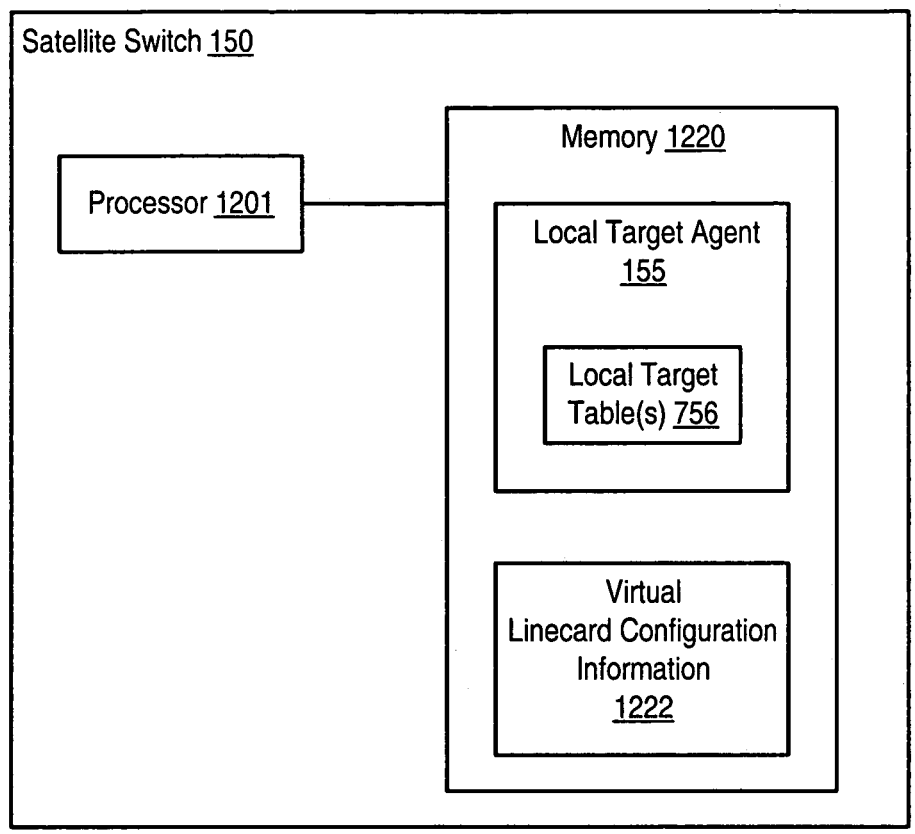
FIG. 12 is a block diagram of a satellite switch illustrating how a local target agent can be implemented in software executing on the switch, according to one embodiment.

FIG. 12 is a block diagram of satellite switch 150 illustrating how a local target agent 155 can be implemented in software executing on the switch (in alternative embodiments, all or part of local target agent 155 can be implemented in hardware). As illustrated, switch 150 includes one or more processors 1201 (e.g., microprocessors, PLDs (Programmable Logic Devices), or ASICs (Application Specific Integrated Circuits)) configured to execute program instructions stored in memory 1220. Memory 1220 can include various types of RAM (Random Access Memory), ROM (Read Only Memory), flash memory, MEMS (Micro Electro-Mechanical Systems) memory, and the like. Processor 1201 and memory 1220 are coupled to send and receive data and control signals by a bus or other interconnect.

Memory 1220 stores program instructions executable by processor 1201 to implement local target agent 155. Memory 1220 can also be used to store local target tables 756 used and maintained by local target agent 155. In some embodiments, memory 1220 also stores local target masks 757 (as shown in FIG. 7) and/or program instructions executable to implement index modification unit 958 (as shown in FIG. 9A).

Memory 1220 can also store various virtual linecard configuration information 1222. Configuration information 1222 can include copies of the values in each register 310 (as shown in FIG. 3C) used to assign a satellite switch port to a virtual linecard or to otherwise associate a satellite switch port with one or more uplink interfaces for port-based loadsharing purposes.

In some embodiments in which local target agent is implemented in a combination of hardware and software, configuration information 1222 can also include, for example, virtual-linecard-specific local target tables. Each virtual-linecard-specific local target table can include associations between forwarding indices and satellite switch ports and uplink interfaces generated by a particular distribution-layer switch. Local target agent 155 can combine the virtual-linecard-specific local target tables (e.g., by logically ORing each bit) to generate a local target table that includes all of the associations generated by all of the distribution-layer switches controlling a virtual linecard in the satellite switch. This comprehensive local target table can be stored for use by local target agent hardware that performs packet forwarding. By maintaining virtual-linecard-specific local target tables, local target agent 155 can update the comprehensive local target table if, for example, one of the distribution-layer switches fails, causing the ports and uplink interfaces included in the virtual linecard controlled by the failed distribution-layer switch to be transferred to one or more other virtual linecards.

The program instructions and data implementing local target agent 155 can be stored upon various computer readable media such as memory 1220. In some embodiments, local target agent 155 software is stored on a computer readable medium such as a CD (Compact Disc), DVD (Digital Versatile Disc), hard disk, optical disk, tape device, floppy disk, and the like). In order be executed by processor 1201, the instructions and data implementing local target agent 155 are loaded into memory 1220 from the other computer readable medium. The instructions and/or data implementing can also be transferred to switch 150 via a network such as the Internet or upon a carrier medium. In some embodiments, a computer readable medium is a carrier medium such as a network and/or a wireless link upon which signals such as electrical, electromagnetic, or digital signals, on which the data and instructions implementing local target agent 155 are encoded, are conveyed.

Although the present invention has been described with respect to specific embodiments thereof, various changes and modifications may be suggested to one skilled in the art. It is intended such changes and modifications fall within the scope of the appended claims.

What is claimed is:

1. A method, comprising:
associating one of a plurality of ports with one of a plurality of uplink interfaces, wherein the associating comprises setting a value of a register associated with the one of the ports;
receiving a packet and a second packet;
conveying the packet from the one of the plurality of ports to the one of the plurality of uplink interfaces or from the one of the plurality of uplink interfaces to the one of the plurality of ports, in response to the one of the plurality of ports being associated with the one of the plurality of uplink interfaces, wherein
the one of the plurality of ports is associated with a virtual local area network (VLAN);
conveying the second packet from a second one of the plurality of ports to the one of the plurality of uplink interfaces or from the one of the plurality of uplink interfaces to the second one of the plurality of ports, in response to the second one of the plurality of ports being associated with the one of the plurality of uplink interfaces,
the second one of the plurality of ports is associated with a different VLAN than the one of the plurality of ports, and
the associating comprises
assigning the one of the ports to one of a plurality of virtual linecards, and
assigning the one of the uplink interfaces to the one of the virtual linecards.

2. The method of claim 1, wherein:
a second plurality of the uplink interfaces are associated with a third one of the ports.

3. The method of claim 2, further comprising
receiving a fourth packet via the third one of the ports; and
conveying the fourth packet between the third one of the ports and a single one of the second plurality of the uplink interfaces.

4. The method of claim 1, wherein
the associating is independent of which VLAN is associated with the one of the ports.

5. The method of claim 1, further comprising:
one of a first plurality of switches, which is coupled to a switch in which the ports and the uplink interfaces are comprised, controlling a respective one of the virtual linecards, wherein the controlling comprises
the one of the first plurality of switches assigning a forwarding index to the one of the ports assigned to the respective one of the virtual linecards,
the one of the first plurality of switches appending the forwarding index to the packet, and
the one of the first plurality of switches forwarding the packet and the appended forwarding index to the switch in which the ports and the uplink interfaces are comprised.

6. The method of claim 5, wherein
each switch comprised in the first plurality of switches is a distribution-layer switch, and
the switch in which the ports and the uplink interfaces are comprised is an access-layer satellite switch.

7. The method of claim 5, wherein
the appended forwarding index identifies which one or more of the ports to which the packet should be conveyed.

8. The method of claim 1, further comprising
receiving the packet and forwarding information appended to the packet via the one of the uplink interfaces;
modifying the forwarding information; and
using the modified forwarding information to select which of the ports to which to convey the packet, wherein
the modified forwarding information only indicates one or more of the ports that are associated with the one of the uplink interfaces.

9. The method of claim 8, wherein
the modifying the forwarding information is dependent on which of the uplink interfaces received the packet and the forwarding information.

10. The method of claim 8, wherein
the modifying the forwarding information comprises remapping a forwarding index to a remapped forwarding index, and
the using the modified forwarding information comprises using the remapped forwarding index to lookup a bitmap in a local target table, wherein the bitmap identifies one or more of the ports.

11. The method of claim 1, further comprising
receiving the packet and forwarding information appended to the packet via the one of the uplink interfaces;
using the forwarding information to lookup a bitmap in a lookup table, wherein the bitmap identifies a subset of the ports;
selecting one of a plurality of masks, wherein the selected one of the plurality of masks identifies each of the ports that is associated with the one of the uplink interfaces that received the packet;
applying the selected one of the masks to the bitmap to generate a masked bitmap; and
conveying the packet to one or more of the ports identified by the masked bitmap.

12. The method of claim 11, wherein
the selecting the one of the plurality of masks is dependent on which one of the uplink interfaces received the packet.

13. The method of claim 1, further comprising
each of a plurality of switches assigning a forwarding index to at least one of the ports, and
each one of the switches coordinating forwarding index assignments for the ports with each other one of the switches.

14. The method of claim 1, further comprising associating a particular one of the ports with a first one of the uplink interfaces, and reassociating the particular one of the ports with a second one of the uplink interfaces,
wherein
the particular one of the ports is no longer associated with the first one of the uplink interfaces subsequent to the reassociating.

15. The method of claim 1, further comprising:
receiving a third packet via the one of the ports;
conveying the third packet to a distribution layer via the one of the uplink interfaces;
receiving a fourth packet via a third one of the ports;
conveying the fourth packet to the distribution layer via a second uplink interface of the uplink interfaces, wherein the second uplink interface is associated with the third one of the ports.

16. The method of claim 15, wherein
the one of the ports is associated with a same VLAN as the third one of the ports.

17. The method of claim 15, wherein
a fourth one of the ports is associated with a different VLAN than the one of the ports, and
the fourth one of the ports is associated with the one of the uplink interfaces.

18. The method of claim 15, further comprising:
receiving a fifth packet and appended forwarding information from the distribution-layer via the one of the uplink interfaces, wherein
the forwarding information appended to the fifth packet identifies one or more of the ports; and
outputting the fifth packet via only ones of the one or more of the ports that are associated with the one of the uplink interfaces.

19. A system, comprising:
a plurality of ports, wherein a value of a register associated with one of the plurality of ports is set to a value indicating that the one of the plurality of ports is associated with one of a plurality of uplink interfaces, wherein the one of the plurality of ports is associated with a VLAN, wherein a second one of the plurality of ports is associated with a different VLAN than the one of the plurality of ports, and wherein both the one of the plurality of ports and second one of the plurality of ports are associated with the one of the plurality of uplink interfaces,
the plurality of uplink interfaces; and
a local target agent, wherein
the local target agent is configured to convey a packet from the one of the ports to the one of the uplink interfaces or from the one of the uplink interfaces to the one of the ports, in response to the one of the plurality of ports being associated with the one of the plurality of uplink interfaces, and to convey a second packet from the second one of the ports to and the one of the uplink interfaces or from the one of the uplink interfaces to the second one of the ports, in response to the second one of the ports being associated with the one of the uplink interfaces,
the one of the ports received the packet, and
the local target agent is configured to convey the packet to the one of the uplink interfaces in response to the one of the uplink interfaces being comprised in a same one of a plurality of virtual linecards as the one of the ports that received the packet.

20. The system of claim 19, wherein:
a second plurality of the uplink interfaces are associated with a third one of the ports.

21. The system of claim 20, wherein
the local target agent is configured to convey a fourth packet between the third one of the ports and a single one of the second plurality of the uplink interfaces in response to receiving the fourth packet via the third one of the ports.

22. The system of claim 19, wherein
one of the virtual linecards is associated with a respective one of a plurality of distribution-layer switches,
one or more uplink interfaces assigned to the one of the virtual linecards are coupled to communicate with the respective one of the distribution-layer switches.

23. The system of claim 19, wherein
the packet and appended forwarding information are received via the one of the uplink interfaces, and
the local target agent is configured to
use the forwarding information appended to the packet to select a bitmap identifying one or more of the ports;
select one of a plurality of masks, wherein each of the plurality of masks selects one or more of the ports comprised in a respective one of the virtual linecards;
apply the selected one of the masks to the bitmap to produce a masked bitmap; and
output the packet from one or more of the ports identified by the masked bitmap.

24. The system of claim 23, wherein
the local target agent is configured to select the one of the masks dependent upon which one of the uplink interfaces received the packet.

25. The system of claim 19, wherein:
the local target agent is configured to:
modify forwarding information appended to the packet;
use the modified forwarding information to select a bitmap identifying one or more of the ports from which to output the packet.

26. The system of claim 25, wherein
the local target agent is configured to modify the forwarding information dependent upon which one of the uplink interfaces received the forwarding information and the packet.

27. The system of claim 19, wherein
the local target agent is configured to use a forwarding index appended to each packet received via one of the uplink interfaces to select which one or more of the ports from which to output each packet;
the local target agent is configured to select a first set of one or more of the ports if a fourth packet, to which a first forwarding index is appended, is received via a first one of the uplink interfaces; and
the local target agent is configured to select a different set of one or more of the ports if a fifth packet, to which the first forwarding index is appended, is received via a second one of the uplink interfaces.

28. A method, comprising:
assigning each of a plurality of ports to one of a plurality of virtual linecards, wherein one of the plurality of ports is associated with a VLAN, wherein a second one of the plurality of ports is associated with a different VLAN than the one of the plurality of ports, wherein both the one of the plurality of ports and second one of the plurality of ports are assigned to the one of the plurality of virtual linecards, and wherein the assigning each of the plurality of ports comprises setting a value of a register associated with each of the plurality of ports;
assigning each of a plurality of uplink interfaces to one of the virtual linecards;
conveying a packet between the one of the plurality of ports and to one of the plurality of uplink interfaces, in response to the one of the plurality of uplink interfaces also being assigned to the one of the of the plurality of virtual linecards; and
conveying a second packet between the second one of the plurality of ports and the one of the plurality of uplink interfaces, in response to the one of the plurality of uplink interfaces also being assigned to the one of the plurality of virtual linecards.

29. The method of claim 28, further comprising:
communicating a third packet between a port of the ports and an uplink interface of the uplink interfaces dependent on whether the port and the uplink interface are assigned to a same one of the virtual linecards.

30. The method of claim 29, wherein
the assigning each of the ports comprises setting registers respectively associated with each of the ports to indicate the one of the uplink interfaces.

31. The method of claim 29, wherein
the communicating comprises outputting the packet via one of the uplink interfaces comprised in the same one of the virtual linecards as one of the ports that received the packet.

32. The method of claim 29, further comprising:
receiving forwarding information and an additional packet from a switch via an uplink interface of the plurality of uplink interfaces;

modifying the forwarding information;
using the modified forwarding information to select which of the ports from which to output the additional packet, wherein
the modified forwarding information only indicates ones of the ports comprised in the one of the virtual linecards that comprises the uplink interface that received the additional packet and the forwarding information.

33. The method of claim 32, wherein
the modifying the forwarding information is dependent on which one of the virtual linecards comprises the uplink interface that received the additional packet.

34. The method of claim 32, wherein
the modifying forwarding information comprises remapping a forwarding index to a remapped forwarding index, and
the using the modified forwarding information comprises using the remapped forwarding index to lookup a bitmap in a local target table, wherein
the bitmap selects one or more of the ports from which the additional packet should be output.

35. The method of claim 28, wherein
the assigning each of the ports to one of the virtual linecards comprises assigning a first port of the ports to a first virtual linecard of the virtual linecards,
the method further comprising:
reassigning the first port to a second virtual linecard of the virtual linecards, wherein
the first port is no longer assigned to the first virtual linecard subsequent to the reassigning.

36. The method of claim 28, wherein
more than one of the uplink interfaces are assigned to a same one of the virtual linecards; and
each of the more than one of the uplink interfaces is coupled to a same one of a plurality of distribution-layer switches.

37. A non-transitory computer readable medium, comprising program instructions executable to:
associate one of a plurality of ports with one of a plurality of uplink interfaces by setting a value of a register associated with the one of the ports, wherein the one of the plurality of ports is associated with a VLAN, wherein a second one of the plurality of ports is associated with a different VLAN than the one of the plurality of ports, and wherein both the one of the plurality of ports and second one of the plurality of ports are associated with the one of the plurality of uplink interfaces;
detect reception of a packet and a second packet by a network device, wherein the network device comprises the plurality of ports and the plurality of uplink interfaces; and
convey the packet from the one of the ports to the one of the uplink interfaces or from the one of the uplink interfaces to the one of the ports, in response to the one of the plurality of ports being associated with the one of the plurality of uplink interfaces;
convey the second packet from the second one of the plurality of ports to the one of the plurality of uplink interfaces or from the one of the uplink interfaces to the second one of the ports, in response to the second one of the plurality of ports being associated with the one of the plurality of uplink interfaces; and
detect that the one of the ports and the one of the uplink interfaces are associated with each other if the one of the ports and the one of the uplink interfaces are assigned to a same one of a plurality of virtual linecards.

38. The non-transitory computer readable medium of claim 37, wherein:
a second plurality of the uplink interfaces are associated with a third one of the ports.

39. The non-transitory computer readable medium of claim 38, wherein the program instructions are further executable to:
use forwarding information appended to the packet to select one or more of the ports from which to output the packet.

40. The non-transitory computer readable medium of claim 39, wherein the program instructions are further executable to:
modify the forwarding information appended to the packet dependent on which one of the uplink interfaces received the packet; and
use the modified forwarding information to select which of the ports from which to output the packet, wherein
the modified forwarding information only indicates one or more of the ports associated with whichever one of the uplink interfaces received the packet and the forwarding information.

41. The non-transitory computer readable medium of claim 37, wherein the program instructions are further executable to:
associate a first one of the ports with a first one of the uplink interfaces, and
reassociate the first one of the ports with a second one of the uplink interfaces, wherein the first one of the ports is no longer associated with the first one of the uplink interfaces subsequent to being reassociated.

42. A system, comprising:
a processor; and
a memory storing program instructions executable by the processor to:
associate one of a plurality of ports with one of a plurality of uplink interfaces by setting a value of a register associated with the one of the ports, wherein the one of the plurality of ports is associated with a VLAN, wherein a second one of the plurality of ports is associated with a different VLAN than the one of the plurality of ports, and wherein both the one of the plurality of ports and second one of the plurality of ports are associated with the one of the plurality of uplink interfaces;
detect reception of a packet and a second packet by a network device, wherein
the network device comprises the plurality of ports and the plurality of uplink interface; and
convey the packet from the one of the ports to the one of the uplink interfaces or from the one of the uplink interfaces to the one of the ports, in response to the one of the ports being associated with the one of the uplink interfaces;
convey the second packet from the second one of the plurality of ports to the one of the plurality of uplink interfaces or from the one of the plurality of uplink interfaces to the second one of the ports, in response to the second one of the plurality of ports being associated with the one of the plurality of uplink interfaces; and
detect that the one of the ports and the one of the uplink interfaces are associated with each other if the one of the ports and the one of the uplink interfaces are assigned to a same one of a plurality of virtual linecards.

43. The system of claim 42, wherein the program instructions are further executable to:
use forwarding information appended to the packet to select one or more of the ports from which to output the packet.

44. The system of claim 43, wherein the program instructions are further executable to:
- modify the forwarding information appended to the packet dependent on which one of the uplink interfaces received the packet; and
- use the modified forwarding information to select which of the ports from which to output the packet, wherein the modified forwarding information only indicates one or more of the ports that are associated with whichever one of the uplink interfaces received the packet and the forwarding information.

* * * * *